(12) United States Patent
Scholz et al.

(10) Patent No.: US 12,363,035 B2
(45) Date of Patent: Jul. 15, 2025

(54) OPPORTUNISTIC MESH FOR SOFTWARE-DEFINED WIDE AREA NETWORK (SD-WAN)

(71) Applicant: Juniper Networks, Inc., Sunnyvale, CA (US)

(72) Inventors: Hendrik Scholz, Berlin (DE); Abilash Menon, Boxborough, MA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 706 days.

(21) Appl. No.: 17/449,311

(22) Filed: Sep. 29, 2021

(65) Prior Publication Data

US 2023/0116163 A1    Apr. 13, 2023

(51) Int. Cl.
*H04L 45/74* (2022.01)
*H04L 41/00* (2022.01)
(Continued)

(52) U.S. Cl.
CPC .............. *H04L 45/74* (2013.01); *H04L 41/12* (2013.01); *H04L 41/20* (2013.01); *H04L 45/123* (2013.01); *H04L 61/2567* (2013.01)

(58) Field of Classification Search
CPC ....................................................... H04L 45/74
See application file for complete search history.

(56) References Cited

U.S. PATENT DOCUMENTS

| 6,363,056 B1 | 3/2002 | Beigi et al. |
| 6,515,963 B1 | 2/2003 | Bechtolsheim et al. |

(Continued)

FOREIGN PATENT DOCUMENTS

| CN | 1492630 A | 4/2004 |
| CN | 101552703 A | 10/2009 |

(Continued)

OTHER PUBLICATIONS

Fioccola et al., "Alternate-Marking Method for Passive and Hybrid Performance Monitoring," Internet Engineering Task Force (IETF), RFC 8321, Jan. 2018, 33 pp.

(Continued)

*Primary Examiner* — Guang W Li
(74) *Attorney, Agent, or Firm* — Shumaker & Sieffert, P.A.

(57) ABSTRACT

Techniques are described for forming on-demand mesh connections between spoke routers of a Software-Defined Wide Area Network (SD-WAN) arranged in a hub-and-spoke topology. A first spoke router modifies the first packet to include metadata specifying first reachability information and first Internet Protocol (IP) address information for the first spoke router. The first spoke router forwards the first packet to a hub router for forwarding to a second spoke router. The first spoke router receives a second packet from the hub router that includes metadata specifying second reachability information and second IP address information for the second spoke router. In response to determining that the first reachability information is compatible with the second reachability information, the first spoke router initiates a peering connection with the second spoke router along a path which bypasses the hub router for forwarding subsequent packets of the forward packet flow.

21 Claims, 6 Drawing Sheets

(51) Int. Cl.
*H04L 41/12* (2022.01)
*H04L 45/12* (2022.01)
*H04L 61/2567* (2022.01)

(56) References Cited

U.S. PATENT DOCUMENTS

| | | |
|---|---|---|
| 6,563,824 B1 | 5/2003 | Bhatia et al. |
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 6,868,094 B1 | 3/2005 | Bordonaro et al. |
| 7,020,143 B2 | 3/2006 | Zdan |
| 7,035,214 B1 | 4/2006 | Seddigh et al. |
| 7,106,739 B2 | 9/2006 | Beier |
| 7,150,037 B2 | 12/2006 | Wolf et al. |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,492,713 B1 | 2/2009 | Turner et al. |
| 7,536,720 B2 | 5/2009 | Burdett et al. |
| 7,617,337 B1 | 11/2009 | Beck et al. |
| 7,630,295 B2 | 12/2009 | Hughes et al. |
| 7,634,805 B2 | 12/2009 | Araya |
| 7,706,411 B2 | 5/2010 | Wakumoto et al. |
| 7,730,301 B2 | 6/2010 | Correll et al. |
| 7,773,611 B2 | 8/2010 | Booth, III et al. |
| 7,852,772 B2 | 12/2010 | Filsfils et al. |
| 7,872,973 B2 | 1/2011 | Sterne et al. |
| 7,949,785 B2 | 5/2011 | Alkhatib et al. |
| 7,965,721 B1 | 6/2011 | Gunasekara |
| 8,068,417 B1 | 11/2011 | Roberts |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,438,269 B1 | 5/2013 | West, III |
| 8,499,095 B1 * | 7/2013 | Sullenberger ........... H04L 45/04 |
| | | 370/254 |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,699,373 B1 | 4/2014 | Pani |
| 8,705,524 B1 | 4/2014 | Kelly et al. |
| 8,706,883 B2 * | 4/2014 | Aggarwal ............... H04L 45/24 |
| | | 709/239 |
| 8,737,198 B1 * | 5/2014 | Holness ................. H04L 45/28 |
| | | 370/222 |
| 8,804,489 B2 | 8/2014 | Lu et al. |
| 8,948,174 B2 | 2/2015 | Szyszko et al. |
| 9,021,134 B1 | 4/2015 | Patel |
| 8,942,085 B1 | 6/2015 | Pani et al. |
| 9,059,920 B2 | 6/2015 | Ravindran et al. |
| 8,989,020 B2 | 10/2015 | So |
| 9,160,652 B2 | 10/2015 | Taillon et al. |
| 9,240,953 B2 | 1/2016 | Carlstrom |
| 9,246,800 B1 | 1/2016 | Ramamorrthi et al. |
| 9,252,972 B1 | 2/2016 | Dukes et al. |
| 9,276,864 B1 | 3/2016 | Vincent |
| 9,729,439 B2 | 8/2017 | Melampy et al. |
| 9,729,682 B2 | 8/2017 | Kumar et al. |
| 9,762,485 B2 | 9/2017 | Kaplan et al. |
| 9,838,947 B2 * | 12/2017 | Bosch ................. H04W 40/248 |
| 9,871,748 B2 | 1/2018 | Gosselin et al. |
| 9,894,005 B2 | 2/2018 | Raindel et al. |
| 9,929,949 B2 | 3/2018 | Mahadevan et al. |
| 9,985,883 B2 | 5/2018 | MeLampy et al. |
| 9,998,565 B2 | 6/2018 | Gupta et al. |
| 10,033,843 B2 | 6/2018 | Kumar et al. |
| 10,027,567 B2 | 7/2018 | Cociglio |
| 10,027,768 B2 * | 7/2018 | Rao .......................... H04L 45/64 |
| 10,091,099 B2 | 10/2018 | Menon et al. |
| 10,142,126 B2 * | 11/2018 | Venugopal ............... H04L 67/51 |
| 10,200,264 B2 | 2/2019 | Menon et al. |
| 10,257,061 B2 | 4/2019 | Menon et al. |
| 10,277,506 B2 | 4/2019 | Timmons et al. |
| 10,341,140 B2 * | 7/2019 | Shen .................... H04L 12/4633 |
| 10,355,989 B1 * | 7/2019 | Panchal .................. H04L 67/10 |
| 10,425,511 B2 | 9/2019 | McCulley et al. |
| 10,432,519 B2 | 10/2019 | Baj et al. |
| 10,432,522 B2 | 10/2019 | Kaplan et al. |
| 10,602,422 B1 | 3/2020 | Jagannatha et al. |
| 10,841,206 B2 * | 11/2020 | Menon .................... H04L 47/16 |
| 11,075,824 B2 | 7/2021 | McCulley et al. |
| 11,165,863 B1 | 11/2021 | Timmons et al. |
| 11,223,538 B1 * | 1/2022 | Arumugam ............. H04L 45/26 |
| 11,252,126 B1 * | 2/2022 | Thunga .................. H04L 45/48 |
| 11,429,463 B2 * | 8/2022 | Graham ................ G06F 9/5005 |
| 11,438,255 B2 * | 9/2022 | Tillotson ............. H04L 45/7453 |
| 11,503,116 B1 * | 11/2022 | Timmons ................ H04L 45/58 |
| 11,575,560 B2 * | 2/2023 | Ramachandran ... H04L 12/4633 |
| 11,582,144 B2 * | 2/2023 | Ramaswamy .......... H04L 43/16 |
| 11,972,134 B2 * | 4/2024 | Irwin .................... G06F 3/0673 |
| 11,973,686 B1 * | 4/2024 | Panchal .................. H04L 45/66 |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0176363 A1 | 11/2002 | Durinovic-Johri et al. |
| 2003/0016628 A1 | 1/2003 | Kadambi et al. |
| 2003/0198189 A1 | 10/2003 | Roberts et al. |
| 2003/0214938 A1 | 11/2003 | Jindal et al. |
| 2004/0024985 A1 | 2/2004 | Hudson |
| 2004/0052259 A1 | 3/2004 | Garcia et al. |
| 2004/0088542 A1 | 5/2004 | Daude et al. |
| 2004/0246964 A1 | 12/2004 | Grimminger et al. |
| 2004/0264434 A1 | 12/2004 | Weissberger et al. |
| 2004/0264481 A1 | 12/2004 | Darling et al. |
| 2005/0025069 A1 * | 2/2005 | Aysan .................. H04L 12/4641 |
| | | 370/254 |
| 2005/0036616 A1 | 2/2005 | Huang et al. |
| 2005/0058081 A1 | 3/2005 | Elliott |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0146813 A1 | 7/2006 | Biswas et al. |
| 2006/0176894 A1 | 8/2006 | Oh et al. |
| 2006/0236370 A1 | 10/2006 | John et al. |
| 2006/0239204 A1 | 10/2006 | Bordonaro et al. |
| 2007/0058528 A1 | 3/2007 | Massa et al. |
| 2007/0171825 A1 | 7/2007 | Roberts et al. |
| 2007/0171826 A1 | 7/2007 | Roberts et al. |
| 2007/0253418 A1 | 11/2007 | Shiri et al. |
| 2008/0159145 A1 | 7/2008 | Muthukrishnan et al. |
| 2008/0214175 A1 | 9/2008 | Papadoglou et al. |
| 2009/0003212 A1 | 1/2009 | Kwan et al. |
| 2009/0007021 A1 | 1/2009 | Hayton |
| 2009/0059958 A1 | 3/2009 | Nakata |
| 2009/0097417 A1 * | 4/2009 | Asati ....................... H04L 45/17 |
| | | 370/255 |
| 2009/0154341 A1 | 6/2009 | Bhupalam et al. |
| 2010/0125898 A1 | 5/2010 | Dubuc et al. |
| 2010/0191968 A1 | 7/2010 | Patil et al. |
| 2010/0246602 A1 | 9/2010 | Barreto et al. |
| 2010/0322238 A1 | 12/2010 | Denis-Courmont et al. |
| 2011/0007743 A1 | 1/2011 | Kuwabara et al. |
| 2011/0069685 A1 | 3/2011 | Tofighbakhsh |
| 2011/0069714 A1 | 3/2011 | Le Pennec et al. |
| 2011/0299554 A1 | 12/2011 | Ros-Giralt et al. |
| 2012/0144061 A1 | 6/2012 | Song |
| 2012/0236860 A1 | 9/2012 | Kompella et al. |
| 2013/0114482 A1 | 5/2013 | Oh et al. |
| 2013/0227166 A1 | 9/2013 | Ravindran et al. |
| 2013/0229922 A1 | 9/2013 | Li et al. |
| 2013/0230051 A1 | 9/2013 | Lockwood |
| 2013/0297824 A1 | 11/2013 | Lan et al. |
| 2014/0040488 A1 | 2/2014 | Small et al. |
| 2014/0189050 A1 | 7/2014 | Rijsman et al. |
| 2014/0226514 A1 | 8/2014 | Zhou |
| 2014/0362686 A1 | 12/2014 | Jogalekar et al. |
| 2014/0369351 A1 | 12/2014 | Singh et al. |

(56) References Cited

U.S. PATENT DOCUMENTS

| | | |
|---|---|---|
| 2015/0003248 A1 | 1/2015 | Hamdi et al. |
| 2015/0016446 A1 | 1/2015 | Scott |
| 2015/0058492 A1 | 2/2015 | Meloche |
| 2015/0092551 A1 | 4/2015 | Moisand et al. |
| 2015/0109967 A1 | 4/2015 | Hogan et al. |
| 2015/0124622 A1 | 5/2015 | Kovvali et al. |
| 2015/0188814 A1 | 7/2015 | Jain et al. |
| 2015/0215841 A1 | 7/2015 | Hsu et al. |
| 2015/0229618 A1 | 8/2015 | Wan et al. |
| 2015/0237104 A1 | 8/2015 | Oguchi |
| 2015/0319085 A1 | 11/2015 | Hamdi et al. |
| 2015/0372898 A1 | 12/2015 | Haramaty et al. |
| 2015/0372901 A1 | 12/2015 | Pacella |
| 2015/0372916 A1 | 12/2015 | Haramaty et al. |
| 2015/0381324 A1 | 12/2015 | Mirsky et al. |
| 2016/0028608 A1 | 1/2016 | Dasgupta |
| 2016/0036694 A1 | 2/2016 | Abdul et al. |
| 2016/0080195 A1 | 3/2016 | Ramachandran et al. |
| 2016/0080251 A1 | 3/2016 | Ramachandran et al. |
| 2016/0094444 A1 | 3/2016 | MeLampy et al. |
| 2016/0105471 A1 | 4/2016 | Nunes et al. |
| 2016/0134502 A1 | 5/2016 | Edwards et al. |
| 2016/0164780 A1 | 6/2016 | Timmons et al. |
| 2016/0205029 A1 | 7/2016 | Sugunadass |
| 2016/0294715 A1 | 10/2016 | Raindel et al. |
| 2016/0337193 A1* | 11/2016 | Rao .................. H04L 67/63 |
| 2016/0337223 A1 | 11/2016 | Mackay |
| 2016/0344565 A1 | 11/2016 | Batz et al. |
| 2016/0344715 A1 | 11/2016 | Kumar et al. |
| 2016/0344803 A1 | 11/2016 | Batz et al. |
| 2016/0373341 A1* | 12/2016 | Venugopal ............ H04L 67/141 |
| 2017/0026417 A1* | 1/2017 | Ermagan ............. H04L 63/0428 |
| 2017/0063681 A1 | 3/2017 | Kaplan et al. |
| 2017/0063927 A1 | 3/2017 | Schultz et al. |
| 2017/0078410 A1* | 3/2017 | Rao .................. H04L 41/5025 |
| 2017/0099188 A1 | 4/2017 | Chang et al. |
| 2017/0171110 A1 | 6/2017 | Gosselin et al. |
| 2017/0207976 A1 | 7/2017 | Rovner et al. |
| 2017/0250906 A1 | 8/2017 | MeLampy et al. |
| 2017/0339258 A1 | 11/2017 | Momchilov et al. |
| 2017/0346722 A1* | 11/2017 | Smith .................. H04L 45/12 |
| 2017/0353516 A1 | 12/2017 | Gordon |
| 2017/0366618 A1 | 12/2017 | Vrzic et al. |
| 2018/0013584 A1 | 1/2018 | Shen et al. |
| 2018/0123910 A1 | 5/2018 | Fitzgibbon |
| 2018/0270118 A1 | 9/2018 | Lee et al. |
| 2018/0295180 A1 | 10/2018 | Yang et al. |
| 2018/0367445 A1 | 12/2018 | Bajaj |
| 2019/0158605 A1 | 5/2019 | Markuze et al. |
| 2019/0190819 A1 | 6/2019 | Choudhury et al. |
| 2019/0207844 A1 | 7/2019 | Kodavanty et al. |
| 2019/0260657 A1* | 8/2019 | Filsfils ............... H04L 41/5009 |
| 2019/0274070 A1 | 9/2019 | Hughes et al. |
| 2019/0312914 A1* | 10/2019 | Cohn .................. H04L 65/104 |
| 2019/0327111 A1 | 10/2019 | Salgueiro et al. |
| 2020/0092209 A1 | 3/2020 | Chen |
| 2020/0252234 A1* | 8/2020 | Ramamoorthi ......... H04L 45/22 |
| 2020/0366589 A1 | 11/2020 | Kaplan et al. |
| 2020/0366590 A1 | 11/2020 | Kaplan et al. |
| 2020/0366598 A1* | 11/2020 | Kaplan ............... H04L 45/18 |
| 2020/0366599 A1 | 11/2020 | Kaplan et al. |
| 2020/0382471 A1* | 12/2020 | Janakiraman ....... H04L 61/5007 |
| 2020/0403890 A1 | 12/2020 | McCulley et al. |
| 2021/0036953 A1* | 2/2021 | Menon .................. H04L 45/22 |
| 2021/0328889 A1* | 10/2021 | McCulley ........... H04L 43/0864 |
| 2022/0006756 A1* | 1/2022 | Ramaswamy ......... H04L 45/64 |
| 2022/0038385 A1 | 2/2022 | Volkening et al. |
| 2022/0070092 A1 | 3/2022 | Melampy et al. |
| 2022/0078046 A1* | 3/2022 | Wang .................. H04L 45/04 |
| 2022/0086062 A1* | 3/2022 | Gutierrez Estevez ...... H04W 24/08 |
| 2022/0103471 A1* | 3/2022 | Kulkarni ............. H04L 69/168 |
| 2022/0138081 A1 | 5/2022 | Varma et al. |
| 2022/0294725 A1* | 9/2022 | Vasseur .............. H04L 41/5019 |
| 2022/0311695 A1* | 9/2022 | Kaciulis ............. H04L 45/34 |
| 2022/0329563 A1* | 10/2022 | Yeh .................... H04L 12/4641 |
| 2023/0034314 A1* | 2/2023 | Brissette ............ H04L 12/4641 |
| 2023/0059537 A1* | 2/2023 | Gavand .............. H04L 67/1006 |
| 2023/0246930 A1* | 8/2023 | McCulley ........... H04L 43/087 370/252 |
| 2024/0064099 A1* | 2/2024 | Pang ................... H04L 45/54 |

FOREIGN PATENT DOCUMENTS

| | | |
|---|---|---|
| CN | 101646220 A | 2/2010 |
| CN | 101068242 B | 4/2010 |
| CN | 102158371 A | 8/2011 |
| CN | 102404166 A | 4/2012 |
| CN | 102594600 A | 7/2012 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| CN | 105830393 A | 8/2016 |
| CN | 106209413 A | 12/2016 |
| CN | 107810619 A | 3/2018 |
| EP | 1401147 A1 | 3/2004 |
| EP | 1418705 A3 | 4/2006 |
| EP | 1313267 B1 | 12/2006 |
| EP | 2339784 A1 | 6/2011 |
| EP | 3435599 A1 | 1/2019 |
| EP | 3690649 A1 | 8/2020 |
| GB | 1473898 A | 5/1977 |
| JP | 2020167469 A | 10/2020 |
| KR | 1020110062994 A | 6/2011 |
| WO | 2007084707 A2 | 7/2007 |
| WO | 2007084755 A2 | 7/2007 |
| WO | 2015090364 A1 | 6/2015 |
| WO | 2016007052 A1 | 1/2016 |
| WO | 2016048467 A1 | 3/2016 |

OTHER PUBLICATIONS

Fioccola et al., "Alternate-Marking Method," Internet Engineering Task Force (IETF), RFC 9341, Dec. 2022, 22 pp.

U.S. Appl. No. 18/298,106, filed Apr. 10, 2023, naming inventors McCulley et al.

Anonymous, "Cisco SD-WAN Dynamic on-demand Tunnel Feature—The Network DNA", Aug. 31, 2021, 4 pp., Retrieved from the Internet: URL:https://www.thenetworkdna.com/2021/08/cisco-sd-wan-dynamic-on-demand-tunnel.html.

Cisco, "Dynamic On-Demand Tunnels", Aug. 20, 2020, 10 pp., Retrieved from the Internet: URL:https://www.cisco.com/c/en/us/td/docs/routers/sdwan/configuration/system-interface/ios-xe-17/systems-interfaces-book-xe-sdwan/m-dynamic-on-demand-tunnels.pdf.

Extended Search Report from counterpart European Application No. 21215507.1 dated May 20, 2022, 11 pp.

Response to Extended Search Report dated May 20, 2022, from counterpart European Application No. 21215507.1 filed Oct. 5, 2023, 42 pp.

"Application Quality of Experience (AppQoE)" TechLibrary, Juniper Networks, Inc., Sep. 27, 2018, available at https://www.juniper.net/documentation/en_US/junos/topics/topic-map/security-appqoe.html accessed Nov. 1, 2018, 23 pp.

"Cisco Dynamic Multipoint VPN: Simple and Secure Branch-to-Branch Communications Data Sheet," Cisco Systems, Inc., Retrieved from: https://www.cisco.com/c/en/us/products/collateral/security/dynamic-multipoint-vpn-dmvpn/data_sheet_c78-468520.html, Jul. 25, 2017, 7 pp.

"Connect the Enterprise and Multicloud With Secure SD-WAN" Juniper Networks, Inc., Nov. 2018, available at https://www.juniper.net/assets/us/en/local/pdf/solutionbriefs/3510624-en.pdf, last accessed Mar. 29, 2019, 6 pp.

"Contrail SD-WAN and SD-LAN—Design and Architecture Guide", Juniper Networks, Inc., Retrieved from https://www.juniper.net/documentation/en_US/release-independent/solutions/information-

(56) References Cited

OTHER PUBLICATIONS products/pathway-pages/sg-007-sd-wan-sd-lan-design-arch-guide. html, modified Aug. 8, 2019, 126 pp.
"Contrail SDWAN Design & Architecture Guide", Juniper Networks, Inc., 2018, available at https://www.juniper.net/documentation/en_US/release-independent/solutions/information-products/pathway-pages/sg-007-contrail-sd-wan-design-architecture.pdf, last accessed Mar. 27, 2019, 46 pp.
"EANTC Independent Test Report," Juniper Contrail SD-WAN Solution, Sep. 2018, 14 pp.
"Internet Protocol," Darpa Internet Program Protocol Specification, Information Sciences Institute, RFC 791, Sep. 1981, 51 pp.
"SLA Profiles and SD-WAN Policies Overview," Juniper Networks, Aug. 21, 2018, 6 pp.
"Transmission Control Protocol," Darpa Internet Program Protocol Specification, Information Sciences Institute, RFC 793, Sep. 1981, 91 pp.
Apostolopoulos et al.—"Design, Implementation and Performance of a Content-Based Switch", In INFOCOM 2000, Proceedings of the Nineteenth Annual Joint Conference of the IEEE Computer and Communications Societies, Tel Aviv, Israel, 10 pages, Mar. 26-30, 2000.
Berners-Lee et al. Uniform Resource Identifier (URI): Generic Syntax, Network Working Group, Request for Comments 3986, The Internet Society, 61 pages, Jan. 2005.
Bjorklund—Yang—A Data Modeling Language for the Network Configuration Protocol (NETCONF), Internet Engineering Task Force (IETF), Request for Comments 6020, ISSN: 2070-1721, Oct. 2010, 111 pp.
CAIDA Observing routing asymmetry in Internet traffic, ( www.caida.org/research/traffic-analysis/asymmetry/1), 7 pages, dated Jul. 17, 2013.
Chiosi, et al Network Functions Virtualisation -Introductory White Paper, Issue 1, at the "SDN and OpenFlow World Congress", Darmstadt-Germany, (http://portal.etsi.org/nfv/nfv_white_paper), 16 pages, dated Oct. 22, 2012.
Cisco Systems Parallel Express Forwarding on the Cisco 10000 Series, (White Paper) Cisco Systems, 4 pages, printed Jun. 17, 2015.
Data Plane Development Kit Programmer's Guide, Release 16.04.0, 216 pages, Apr. 12, 2016.
Davis Layer 3 Switches Explained, Happy Router, 6 pages, dated Aug. 30, 2007.
Deering et al., "Internet Protocol, Version 6 (IPv6) Specification," Network Working Group, RFC 2460, Dec. 1998, 39 pp.
Dierks et al., "The Transport Layer Security (TLS) Protocol Version 1.2," Network Working Group, RFC 5246, Aug. 2008, 105 pp.
Filsfils, et al. Segment Routing Architecture, Network Working Group, Draft, 28 pages, Oct. 21, 2013.
Guha et al., "NAT Behavioral Requirements for TCP," Network Working Group, RFC 5382, Oct. 2008, 21 pp.
Hansson, et al. A Unified Approach to Constrained Mapping and Routing on Network-on-Chip Architectures, CODES+ISSS '05 Proceedings oft he 3rd IEEE/ACM/IFIP International Conference on Hardware/Software Codesign and System Synthesis, 6 pages, Sep. 19-21, 2005.
Herbert xps: Transmit Packet Steering, Eklektix, Inc., 11 pages, Oct. 26, 2010.
Katz et al. Bidirectional Forwarding Detection (BFD), Internet Engineering Task Force (IETF), Request for Comments 5880, ISSN: 2070-1721, Juniper Networks, 49 pages, Jun. 2010.
Keranen et al., "Interactive Connectivity Establishment (ICE): A Protocol for Network Address Translator (NAT) Traversal," IETF, RFC 8445, Jul. 2018, 100 pp.
Klement—1. 2 Overview of a TCP communications session, RPG IV Socket Tutorial (http://www.scottklement.com/rpg/socketut/overview), 2 pages, 2001. Applicant points out in accordance with MPEP 609.04(a) that the 2001 year of publication is sufficiently earlier than the effective U.S. filing date of the present application, and any foreign priority date that the particular month of publication is not in issue.

Iana Transmission Control Protocol (TCP) Parameters, (www.iana.org/assignments/tcp-parameters/tcp-parameters.xhtm), 5 pages, dated Sep. 22, 2014.
Menon et al. "Secure Vector Reouting (SVR)," draft-menon-svr-00, Network Working Group, Internet-Draft, Oct. 1, 2021, 38 pp.
Microsoft—Introduction to Receive Side Scaling, Developer Resources, https://msdnomicrosoft.com/enus/library/windows/hardware/ff556942(v=vs.85).aspx, 3 pages, Apr. 2014.
Microsoft Non-RSS Receive Processing, Developer Resources, https://msdn.microsoft.com/enus/library/windows/hardware/ff568798(v=vs.85).aspx, 2 pages, Jan. 2015.
Microsoft RSS with a Single Hardware Receive Queue, Developer Resources, https://msdn.microsoft.com/enus/library/windows/hardware/ff570727(v-vs.85).aspx, 2 pages, Jan. 2015.
Microsoft RSS with Hardware Queuing, Developer Resources, https://msdn.microsoft.com/enus/library/windows/hardware/ff570728(v=vs.85).aspx, 2 pages, Jan. 2015.
PC Magazine Encyclopedia Definition of TCPIIP abc's, PC Magazine Encyclopedia (www.pcmag.com/encyclopedia/term/52615), 5 pages, 2005.
Postel, "User Datagram Protocol," RFC 768, Aug. 28, 1980, 3 pp.
Previdi, et al. IPv6 Segment Routing Header (SRH), Network Working Group, Draft, 24 pages, Jul. 3, 2014.
Rescorla, "The Transport Layer Security (TLS) Protocol Version 1.3," Internet Engineering Task Force (IETF), RFC 8446, Aug. 2018, 160 pp.
Roberts The Next Generation of IP-Flow Routing, Ssgrr 2003S International Conference, L'Aquila, Italy, 11 pages, Jul. 29, 2003.
Rouse What is routing table? Posted by Margaret Rouse (http://searchnetworking.techtarget.com/definition/routingtable), 5 pages, Apr. 2007.
Sathyanarayan et al. "Auto Discovery VPN Protocol" draft-sathyanarayan-ipsecmeadvpn-03, available at https://datatracker.ietf.org/meeting/88/materials/slides-88-ipsecme-3 (last accessed Mar. 7, 2019), Nov. 4, 2013, 17 pp.
Shang, et al.—Making Better Use of All Those TCP ACK Packets, Computer Science Department, Worcester Polytechnic Institute, 10 pages, 2005. Applicant points out in accordance with MPEP 609.04(a) that the 2005 year of publication is sufficiently earlier than the effective U.S. filing date of the present application, and any foreign priority date that the particular month of publication is not in issue.
Shaw Multi-queue network interfaces with SMP on Linux, Greenhost, https://greenhost.net/2013/04/10/multi-queuenetwork-interfaces-with-smp-on-linux/, 5 pages, Apr. 10, 2013.
Sollins, et al. Functional Requirements for Uniform Resource Names, Network Working Group, Request for Comments 1737, 7 pages, Dec. 1994.
Srinivasan, et al. A Technique for Low Energy Mapping and Routing in Network-on-Chip Architectures, ISLPED '05 Proceedings of the 2005 International Symposium on Low Power Electronics and Design, 6 pages, Aug. 8-10, 2005.
Suchara et al.—"Network architecture for joint failure recovery and traffic engineering", SIGMETRICS '11, Proceedings of the ACM SIGMETRICS Joint International Conference on Measurement and Modeling of Computer Systems, San Jose, CA, USA, pp. 97-108, Jun. 7-11, 2011.
U.S. Appl. No. 17/454,071, filed Nov. 9, 2021, naming inventors Timmons.
Wikipedia—Active queue management https://en.wikipedia.org/wiki/Active_queue_management, 2 pages, Apr. 22, 2015.
Wikipedia—LAN switching, 5 pages, dated Jun. 12, 2013.
Wikipedia—Management information base, 6 pages, dated Jul. 15, 2013.
Wikipedia—Reverse path forwarding, 3 pages, dated Jul. 31, 2013.
Wikipedia Equal-cost multi-path routing, 1 page, dated Sep. 12, 2013.
Wikipedia Network address translation, 11 pages, dated Sep. 24, 2013.
Wikipedia Network interface controller, https://en.wikipedia.org/wiki/Network_interface_controller, 5 pages, May 19, 2015.
Wikipedia Network socket, 4 pages, dated Sep. 19, 2013.
Wikipedia Open vSwitch, 2 pages, dated Nov. 24, 2013.
Wikipedia Router (computing), 8 pages, dated Sep. 23, 2013.

(56) References Cited

OTHER PUBLICATIONS

Wikipedia Software-defined networking, 6 pages, dated Sep. 16, 2013.
Wikipedia Transmission Control Protocol, 18 pages, dated Sep. 16, 2013.
Yi et al.—"A case for stateful forwarding plane", Computer Communications, Elsevier, vol. 36, No. 7, pp. 779-791, Apr. 2013.
Communication pursuant to Article 94(3) EPC from counterpart European Application No. 21215507.1 dated Sep. 4, 2024, 9 pp.
Response to Communication pursuant to Article 94(3) EPC dated Sep. 4, 2024, from counterpart European Application No. 21215507.1 filed Jan. 3, 2025, 116 pp.

\* cited by examiner

OPPORTUNISTIC MESH FOR SOFTWARE-DEFINED WIDE AREA NETWORK (SD-WAN)

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for forming on-demand mesh connections between spoke routers of a Software-Defined Wide Area Network (SD-WAN) arranged in a hub-and-spoke topology. In one example, a plurality of spoke routers and at least one hub router operate according to a hub-and-spoke topology to form an SD-WAN that provides interconnectivity to a plurality of customer networks connected to each spoke router of the plurality of spoke routers. Each spoke router is configured to route network traffic through the hub router but not through other spoke routers, and the hub router may route network traffic through spoke routers, as well as other hub routers.

A first client device of a first customer network is connected to a first spoke router and a second client device of a second customer network is connected to a second spoke router. When the first spoke router receives network traffic for a session between the first client device and the second client device, the first spoke router may typically forward the network traffic along a first path from the first spoke router through a hub router toward the second spoke router. While the first spoke router may be configured with routes to the second spoke router that pass through the hub router, such routes through the hub router may not be the most desirable. For example, a direct path from the first spoke router to the second spoke router may include fewer next-hop devices, and therefore may provide lower latency or increased performance for routing of the network traffic. However, because the plurality of spoke routers and a plurality of hub routers operate according to the hub-and-spoke topology where spoke routers do not route traffic directly to one another, conventional spoke routers may be unable to determine whether such a direct path from the first spoke router to the second spoke bypassing the hub routers of the hub-and-spoke topology improves performance and take advantage of such performance benefits by bypassing the hub routers.

In accordance with the techniques of the disclosure, a first spoke router receives a first packet of a plurality of packets of a forward packet flow originating from a first client device and destined for a second client device of a session between the first client device and the second client device. The first spoke router modifies the first packet of the forward packet flow to include metadata specifying first reachability information for the first spoke router and first Internet Protocol (IP) address information for the first spoke router. In some examples, the first reachability information specifies a first tag with which at least a first interface of the first spoke router is configured. The first tag corresponds to a neighborhood to which the first interface of the first spoke router is assigned. The first IP address information comprises a first IP address and a first port of the first spoke router. The first spoke router forwards the first packet to a hub router for forwarding to a second spoke router of the plurality of routers for forwarding, by the second spoke router, to the second client device.

In one example where the first spoke router and the second spoke router communicate along a bidirectional path, the second spoke router receives, from the hub router, the first packet. In response to receiving the first packet, the second spoke router modifies a second packet of a plurality of packets of a reverse packet flow originating from the second client device and destined for the first client device of the session to include metadata specifying second reachability information for the second spoke router and second IP address information for the second spoke router. In some examples, the second reachability information specifies a second tag with which at least a second interface of the second spoke router is configured. The second tag corresponds to a neighborhood to which the second interface of the second spoke router is assigned. The second IP address information comprises a second IP address and a second port of the second spoke router. The second spoke router forwards the second packet to the hub router for forwarding to the first spoke router for forwarding, by the first spoke router, to the first client device.

The first spoke router receives, from the hub router, the second packet. The first spoke router determines that the first reachability information is compatible with the second reachability information. For example, the first spoke router determines, based on the first reachability information and the second reachability information, that both the first interface of the first spoke router and the second interface of the second spoke router are configured with a same tag such that both the first interface of the first spoke router and the second interface of the second spoke router are assigned a same neighborhood. Based on the determination that the first reachability information is compatible with the second reachability information, the first spoke router uses the first IP address information and the second IP address information to initiate a peering connection with the second spoke router along a first path which bypasses the hub router.

Additionally, the first spoke router determines one or more first path quality metrics for the first path which bypasses the hub router and one or more second path quality metrics for a second path from the first spoke router through the hub router to the second spoke router. For example, the first and second path quality metrics are one or more of a latency, jitter, packet loss, or bandwidth of the first and second path, respectively. In some examples, the first spoke router, the hub router, and the second spoke router may inject path quality metrics into the network traffic for the session between the first and second client devices prior to forwarding the network traffic so as to reduce the network requirements of the path quality metrics. The first spoke router compares the first and second path quality metrics to determine if the path bypassing the hub router meets or exceeds performance requirements in comparison to the path through the hub router. In response to determining that the one or more first path quality metrics meet or exceed the second path quality metrics and/or one or more SLA requirements for the session, the first spoke router forwards, to the second spoke router, and along the path which bypasses the hub router, subsequent packets of the forward packet flow.

In one example where the first spoke router and the second spoke router communicate along a unidirectional path, the second spoke router receives, from the hub router, the first packet. Because the path is unidirectional, the first spoke router may be unable to initiate the peering connection with the second spoke router as described above. Therefore, in this example, the second router uses the first reachability information and first IP address information of the first packet received from the first spoke router to initiate the peering connection with the first spoke router along the path which bypasses the hub router as described above. For example, the second spoke router may determine whether the first reachability information is compatible with the second reachability information, obtain the one or more first path quality metrics and one or more second path quality metrics, and initiate the peering connection with the first spoke router. In response to the second spoke router initiating, based on the first reachability information and using the first IP address information, the peering connection with the first spoke router along the path which bypasses the hub router, the first spoke router forwards, to the second spoke router, subsequent packets of the forward packet flow along the path which bypasses the hub router, thereby bypassing the hub router despite that both the first spoke router and the second spoke router are configured as spokes of the hub-and-spoke topology.

The techniques of the disclosure may provide specific improvements to the computer-related field of computer networking that have practical applications. For example, the techniques disclosed herein may enable a spoke router of an SD-WAN to bypass a hub router when forwarding traffic to another spoke router. Bypassing the hub router may reduce the computational and network demands on the hub router, thereby improving scalability of the SD-WAN. Furthermore, the techniques of the disclosure may enable a spoke router to use metrics to ensure that a path to another spoke router exceeds Software License Agreement (SLA) requirements or provides increased network performance over a path through a hub router prior to rerouting traffic to bypass the hub router. Additionally, the techniques of the disclosure may enable a spoke router to make the determination of whether to use a path through the hub router or use a path that bypasses the hub router, thereby obviating the need for a Software-Defined Networking (SDN) controller in the SD-WAN to perform traffic engineering, such that the SD-WAN described herein may be more scalable than an SD-WAN that uses an SDN controller. Additionally, the techniques described herein may enable the forwarding of traffic between spoke routers and hub routers without the need for tunnels or encapsulation, thereby eliminating the computational overhead associated with the use of tunnels or encapsulation such that the techniques of the disclosure may enable the SD-WAN as described herein to use less network resources than other tunnel-based SD-WANs that use, e.g., Internet Protocol Security (IPsec) tunnels to provide connectivity between customer networks. The techniques disclosed herein may also enable an SD-WAN to provide full mesh support to disparate customer networks connected by the SD-WAN when such full-mesh support would be advantageous to the SD-WAN, thereby minimizing the network resources otherwise required to implement a static, full-mesh SD-WAN amongst customer networks. Furthermore, the techniques of the disclosure may remove the need for generating additional network traffic for use in performing quality monitoring of peering connections, which may reduce the consumption of network resources, especially over constrained network paths or pay-by-volume networks such as satellite or 4G and/or 5G mobile networks.

In one example, this disclosure describes a method comprising: receiving, by a first spoke router of a plurality of spoke routers, a first packet of a plurality of packets of a forward packet flow originating from a first client device and destined for a second client device; modifying, by the first spoke router, the first packet of the forward packet flow to include metadata specifying first reachability information for the first spoke router and first IP address information for the first spoke router; and forwarding, by the first spoke router, the first packet to a hub router for forwarding to a second spoke router of the plurality of spoke routers for forwarding, by the second spoke router, to the second client device, wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and wherein the first client device belongs to a first customer network of the plurality of customer networks and the second client device belongs to a second customer network of the plurality of customer networks.

In another example, this disclosure describes a first spoke router of a plurality of spoke routers, the first spoke router comprising processing circuitry configured to: receive a first packet of a plurality of packets of a forward packet flow originating from a first client device and destined for a second client device; modify the first packet of the forward packet flow to include metadata specifying first reachability information for the first spoke router and first IP address information for the first spoke router; and forward the first packet to a hub router for forwarding to a second spoke router of the plurality of spoke routers for forwarding, by the second spoke router, to the second client device, wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and wherein the first client device belongs to a first customer network of the plurality of customer networks and the second client device belongs to a second customer network of the plurality of customer networks.

In another example, this disclosure describes a non-transitory, computer-readable medium comprising instructions that, when executed, are configured to cause processing circuitry of a first spoke router of a plurality of spoke routers to: receive a first packet of a plurality of packets of a forward packet flow originating from a first client device and destined for a second client device; modify the first packet of the forward packet flow to include metadata specifying first reachability information for the first spoke router and first IP address information for the first spoke router; and forward the first packet to a hub router for forwarding to a second spoke router of the plurality of spoke routers for forwarding, by the second spoke router, to the second client device, wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and wherein the first client device belongs to a first customer network of the plurality of customer networks and the second client device belongs to a second customer network of the plurality of customer networks.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
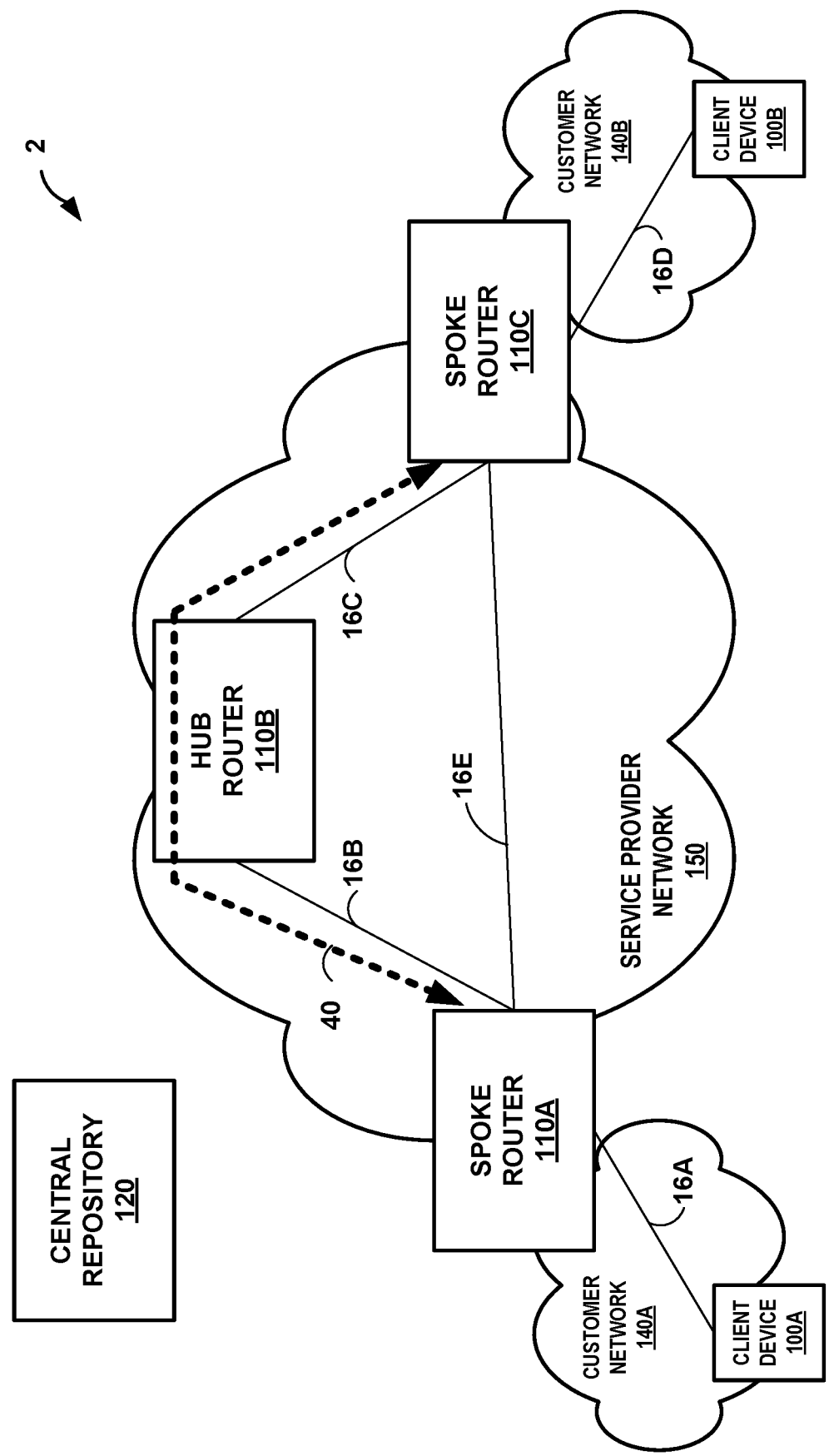
FIGS. 1A-1C are block diagrams illustrating an example computer network system in accordance with the techniques of the disclosure.

As described herein, an edge router, operating as a spoke router of a hub-and-spoke topology forming an SD-WAN and providing interconnectivity to a customer network, may establish edge-to-edge connections with other spoke routers, monitor viability of the connections, and use the connections to route network traffic for a session between client devices so as to bypass hub routers of the SD-WAN. In some examples, each spoke router is aware of other spoke routers and hub routers of the SD-WAN through the use of shared service and topology information accessible from a central repository. Additionally, each spoke router may learn a public address of other spoke routers and hub routers of the SD-WAN. According to default configuration, each spoke router forms a peering connection with one or more hub routers, which allows for redundant connections and routing network traffic for applications and services between any spoke routers in accordance with policies with which the routers are configured. In response to identifying a new session that flows from a first spoke router operating as an edge of the SD-WAN to a second spoke router operating as another edge of the SD-WAN, the first spoke router may forward network traffic for the session along an existing network path via one or more hub routers.

While forwarding network traffic for the session toward the hub router, the first spoke router may establish a peering connection to the second spoke router and probe the connection for viability, such as path quality, jitter, packet loss, latency, SLA compliance, etc. The first spoke router compares the quality of the edge-to-edge connection with the path through the hub router and/or SLA requirements. In response to determining that the path quality of the edge-to-edge connection meets or exceeds the path through the hub router, the first spoke router migrates the network traffic for the session from the path through the hub to the edge-to-edge path, thereby bypassing the hub. In some examples, the first spoke router may support seamless migration of sessions using Secure Vector Routing (SVR). Additionally, the first spoke router may perform quality monitoring, such as through the use of Bidirectional Forwarding Detection (BFD) or in-flow performance monitoring (also referred to as "in-line" performance monitoring), to obtain path quality metrics for the path through the hub router and/or the path bypassing the hub router. The first spoke router may use the path quality metrics to migrate the session back to the path through the hub router in response to determining that the path bypassing the hub router is unreliable or fails to satisfy SLA requirements. Additionally, the first spoke router may duplicate the network traffic for the session so as to send duplicate packet flows through both the path through the hub router and the path bypassing the hub router so as to provide high availability to the session. In some examples, the first spoke router may use other techniques for providing high availability not expressly described herein.

Figure 1B:
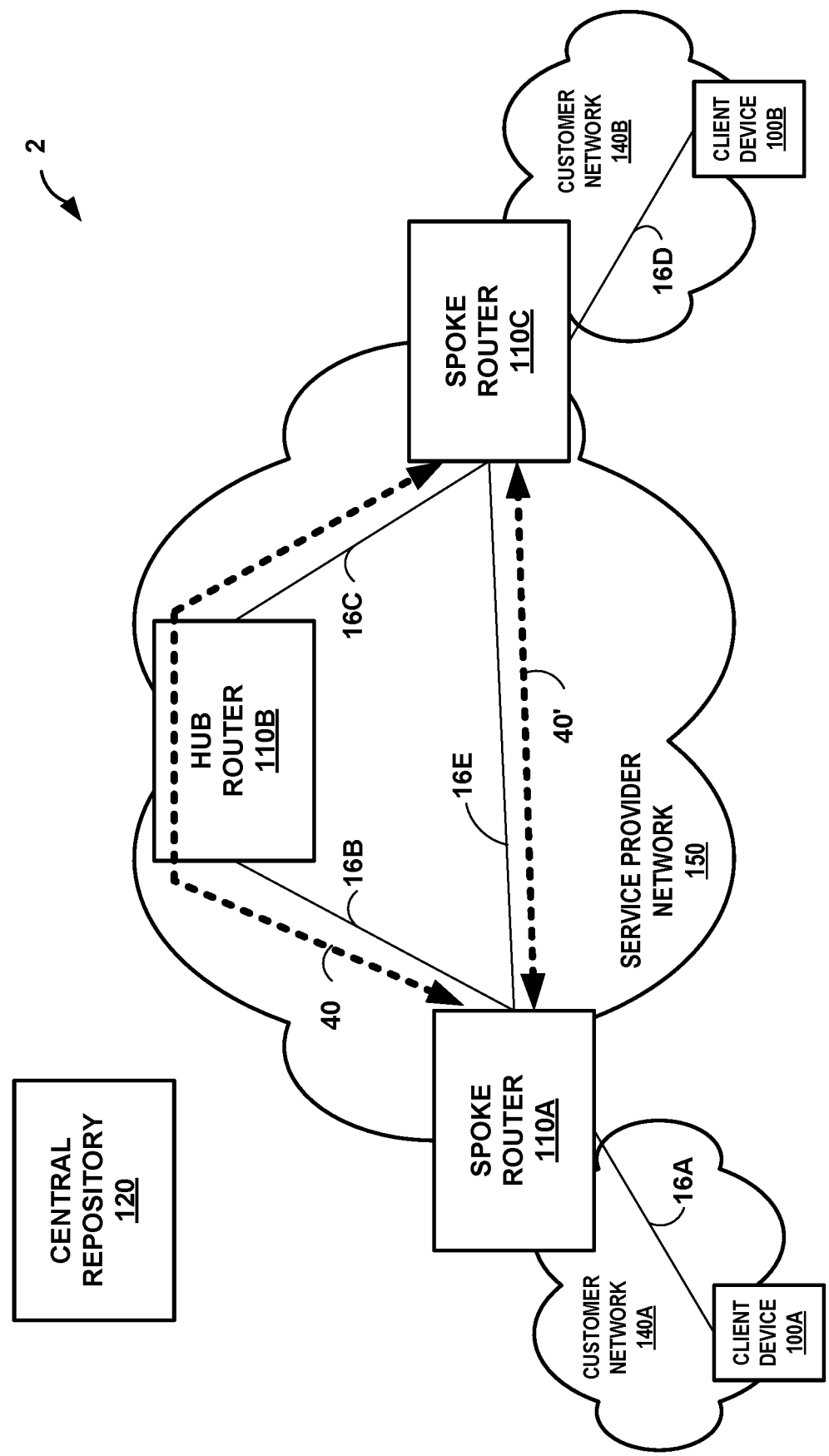
Figure 1C:
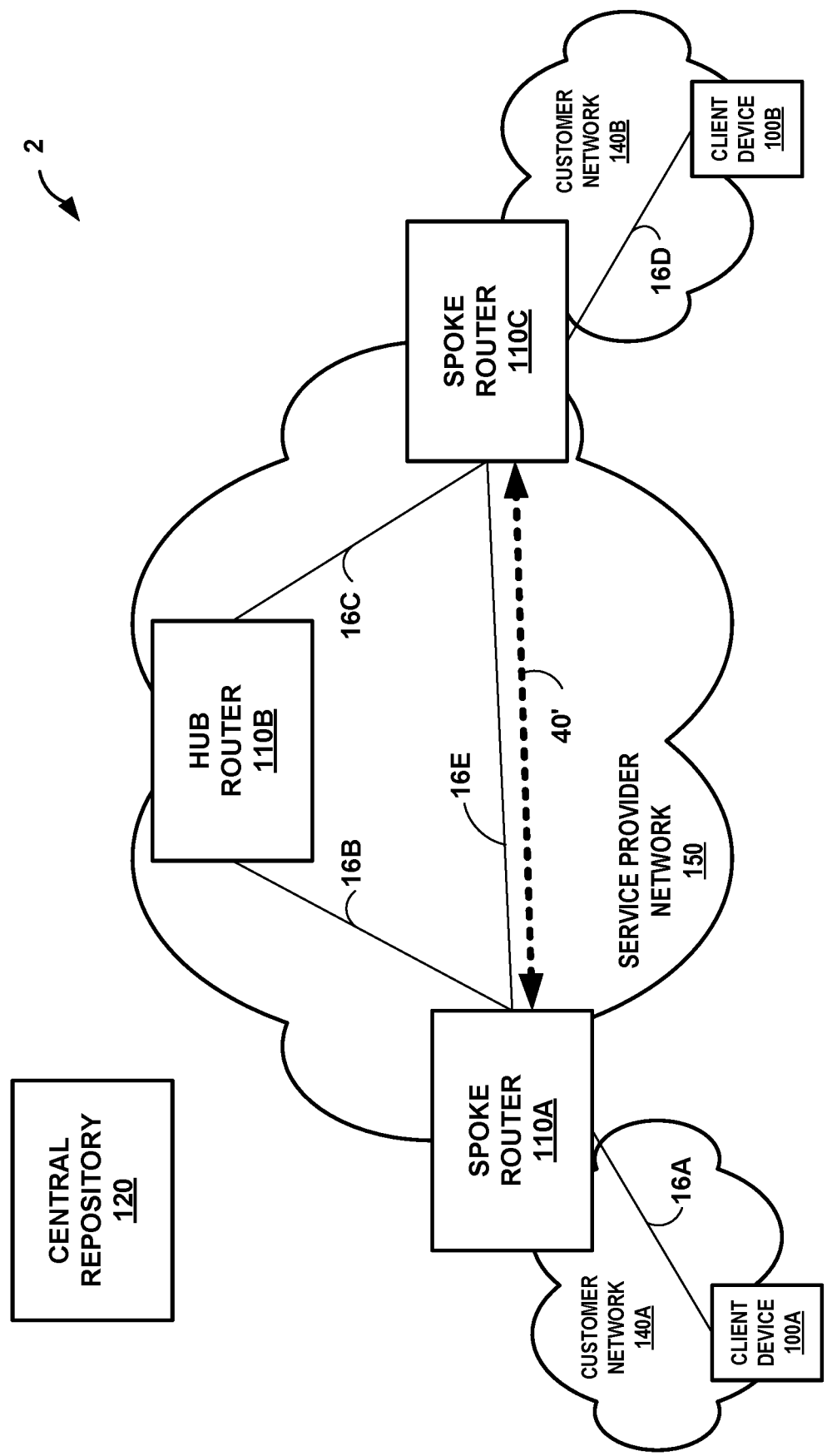

FIGS. 1A-1C are block diagrams illustrating an example computer network system 2 in accordance with the techniques of the disclosure. In the example of FIG. 1A, computer network system 2 includes service provider network 150 configured to provide Software-Defined Wide Area Network (SD-WAN) connectivity to disparate customer networks 140A-140B ("customer networks 140"). Routers 110A-110C (collectively, "routers 110") of service provider network 150 provide client devices 100A-100B (collectively, "client devices 100") associated with customer networks 140 with access to service provider network 150. In some examples, customer networks 140 are enterprise networks. For ease of illustration, customer network 140A is depicted as having a single client device 100A and customer network 140B is depicted as having a single client device 100B, but each of customer networks 140 may have any number of client devices. Typically, customer networks 140 include many client devices 100, each of which may communicate across service provider network 150 with one another as described in more detail below. Communication links 16A-16E (collectively, links "16") may be Ethernet, ATM or any other suitable network connections. In some examples each link 16 may represent one or more physical or logical links between one or more service provider networks using one or more different technologies, such as a broadband connection, a mobile network connection, etc. Due to the use of various and different types of networks and connections to implement links 16, each link 16 may offer different network quality, which may impact selection of a path for transporting network traffic of client devices 100.

Routers 110 are illustrated as routers in the example of FIG. 1A. However, the techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1A. The configuration of computer network system 2 illustrated in FIG. 1A is merely an example. For example, computer network system 2 may include any number of customer networks 140. Nonetheless, for ease of description, only customer networks 140A-140C are illustrated in FIG. 1A.

Service provider network 150 represent one or more publicly accessible computer networks that are owned and operated by one or more service providers. Although computer network system 2 is illustrated in the example of FIG. 1A as including multiple interconnected service provider network 150, in other examples computer network system 2 may alternatively include a single service provider network that provides connectivity between customer networks 140. A service provider is usually a large telecommunications entity or corporation. Each of service provider network 150 is usually a large L3 computer network. Each service provider network 150 is an L3 network in the sense that it natively supports L3 operations as described in the OSI model. Common L3 operations include those performed in accordance with L3 protocols, such as IP. L3 is also known as a "network layer" in the OSI model and the term L3 may be used interchangeably with the phrase "network layer" throughout this disclosure.

Although not illustrated, service provider network 150 may be coupled to one or more networks administered by other providers, and may thus form part of a large-scale public network infrastructure, e.g., the Internet. Consequently, customer networks 140 may be viewed as edge networks of the Internet. Service provider network 150 may provide computing devices within customer networks 140, such as client devices 100, with access to the Internet, and may allow the computing devices within customer networks 140 to communicate with each other. In some examples, customer devices 100 consume services from multiple services providers, e.g., in different countries. In some examples, customer device 100A may opt to have multiple internet connections to spoke router 110A, e.g., such as a broadband network connection and a mobile network connection, such as a mobile network that implements the Long Term Evolution (LTE) standard provided by the European Telecommunications Standards Institute (ETSI). Service provider network 150 may be agnostic to the particular IP transport network used underneath.

In some examples, service provider network 150 provides SD-WAN connectivity to customer networks 140A-140B ("customer networks 140"). A Wide-Area Network (WAN) typically provides connectivity to geographically separate customer networks. An SD-WAN extends Software-Defined Networking (SDN) capabilities to a WAN. SDN allows service provider network 150 to decouple underlying physical network infrastructure from virtualized network infrastructure and applications such that the service provider network 150 may be configured and managed in a flexible and scalable manner. Typically, this involves the abstraction or virtualization of the network control plane so as to separate the control plane from the data plane (and/or underlying infrastructure), enabling administrators of service provider network 150 to configure the control plane in software without requiring changes in the physical data plane.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services. As described above, in some examples, service provider network 150 may represent one or more service provider networks. For example, each link 16 of FIG. 1 may represent one or more physical or logical links between one or more service provider networks using one or more different technologies, such as a broadband connection, a mobile network connection, etc.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1A, client device 100A of system 2 establishes session 40 with client device 100B. Routers 110 facilitate establishment of session 40 by transporting network traffic between client device 100A and client device 100B. In some examples, client device 100A may be considered a "source" device in that client device 100A originates sessions 40 between client device 100A and client device 100B, e.g., client device 100A is the "source" of a first packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, spoke router 110A, hub router 110B, spoke router 110C, and client device 100B.

In some examples, client devices 100 may establish session 40 as an L3 session across service provider network 150 according to one or more L3 communication session protocols, including TCP or UDP, etc. For example, to establish session 40 according to TCP such that data may be exchanged according to TCP, client device 100A and client device 100B perform a three-way handshake. Client device 100A sends a first packet comprising a "SYN" flag to client device 100B via service provider network 150. Client device 100B acknowledges receipt of the first packet by responding (via service provider network 150) to client device 100A with a second packet comprising a "SYN-ACK" flag. Client device 100A acknowledges receipt of the second packet by responding to client device 100B with a third packet comprising an "ACK" flag. After sending the third packet, session 40 is established according to TCP and client devices 100A, 100B may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B via service provider network 150. Session 40 may be considered "established" according to UDP upon receipt by client device 100A of any response packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1A, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1A, a stateful routing session may be established from ingress (spoke) router 110A through intermediate (hub) router 110B to egress (spoke) router 110C. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Additionally, router 110A stores the session identifier for session 40 such that, upon receiving subsequent packets for session 40, router 110A may identify the subsequent packets as belonging to the same session 40 and forward the subsequent packets along the same path as the first packet.

Router 110B receives the modified first packet and determines whether the modified first packet includes metadata specifying the session identifier. In response to determining that the modified first packet includes metadata specifying the session identifier, router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 100B, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers (not depicted in the example of FIGS. 1A-1C) process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110C is a terminus router because router 110C may forward packets to client device 100B. Router 110C receives the modified first packet that comprises the metadata specifying the session identifier (e.g., the original source address, source port, destination address, and destination port). Router 110C identifies the modified first packet as destined for a service terminating at router 110C by determining that the destination source address and destination source port specified in the metadata of the modified lead packet corresponds to a destination reachable by router 110C (e.g., client device 100B). Router 110C recovers the original first packet by removing the metadata from the modified first packet and using the metadata to modify the header of the first packet to specify the original source address, source port, destination address, and destination port. Router 110C forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to central repository 120, e.g., a server. Further, each router 110 may receive service and topology state information for each other router 110 in system 2 from central repository 120. In some examples, each router 110 transmits and receives service and topology state information in the form of a JavaScript Object Notation (JSON) document which specifies the service and topology state information for each router 110.

In some examples, routers 110 operate according to a publish-subscribe model. According to this model, each router 110 publishes, to central repository 120, one or more changes in services reachable from the router 110 and/or one or more changes in a network topology for reaching the services from the router 110. Other routers 110 may subscribe to receive publications for the router 110 from central repository 120. In response to receiving changes in the service and topology state information for a router 110, central repository 120 stores the changes in the service and topology state information for the router 110. Further, central repository 120 publishes the changes in the service and topology state information for the router 110 to other routers 110 that are subscribed to receive updates and/or changes for the router 110.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, one or more domains of service provider network 150 may be organized into different "districts," and each subdomain within each domain may be considered to be a neighborhood within that district. In this example, each router 110A, 110B and 110C within service provider network 150 may maintain service and topology state information only for one another, and not for routers outside of service provider network 150. As another example, router 110A and 110B may be organized into a first district or neighborhood, while routers 110B and 110C may be organized into a second district or neighborhood. In this example, router 110A maintains service and topology state information only for routers 110A and 110B and not for router 110C, router 110C maintains service and topology state information only for routers 110B and 110C and not for router 110A, while router 110B may maintain service and topology state information for each of routers 110A, 110B, and 110C. In other examples, an administrator may assign one or more service provider networks 150 into one or more districts, one or more neighborhoods, or a combination of districts and neighborhoods as suits the needs of network system 2.

In some examples, central repository 120 implements a Service and Topology Exchange Protocol (STEP) repository, available from 128 Technology, Inc. and Juniper Networks, Inc. Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In-Flow Performance Monitoring

Bidirectional Forwarding Detection (BFD) is a network protocol that is used to detect faults in a bidirectional path between two network devices, such as link 16B between routers 110A and 110B. BFD provides low-overhead, short-duration detection of failures in the link between the two routers. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, routers 110A and 110B establish a session over link 16B. Typically, routers 110A and 110B establish and tear down a BFD session with a three-way handshake. Typically, routers 110A and 110B may declare link 16B to be operational only after two-way communication is established between routers 110A and 110B. However, this does not preclude the use of unidirectional links. For example, link 16B may represent a first unidirectional link from router 110A to router 11B, and a second unidirectional link from router 110B to router 110A.

Once the BFD session is established, routers 110A and 110B transmit BFD packets periodically over link 16B. Each router 110A, 110B estimates how quickly it may send and receive BFD packets so as to negotiate, with the peer router 110A, 110B how rapidly failure detection may occur. In some examples, routers 110A and 110B may modify, in real-time, these estimates to adapt to network congestion, changes in latency or bandwidth, or other unusual situations. This may allow for the use of a shared medium between fast network devices and slow network devices, while allowing the fast network devices to more rapidly detect failures while allowing the slow network devices to participate in failure detection.

BFD may operate in two modes: asynchronous mode and demand mode. In asynchronous mode, if one of routers 110A and 110B stop receiving BFD packets for some amount of time (the length of which is negotiated as described above), routers 110A and 110B may assume that link 16B (or a component, device, or path forming link 16B)

has failed. In demand mode, routers 110A and 110B may negotiate not to send periodic BFD packets in order to reduce overhead. This assumes that routers 110A and 110B have another way to verify connectivity to one another, such as via the physical layer. However, either router 110A, 110B may still send BFD packets if needed.

Additionally, either router 110A, 110B may use an Echo function. When this function is active, router 110A, e.g., sends a stream of Echo packets to router 110B. Router 110B responses by transmitting the Echo packets back to router 110A via the forwarding plane of router 110B. Router 110A may use the Echo function to test the forwarding path of router 110B, and vice versa. Additional example information regarding BFD is described in "Bidirectional Forwarding Detection (BFD)," RFC 5880, IETF, June 2010, available at https://datatracker.ietf.org/doc/html/rfc5880, the entire contents of which are incorporated herein by reference.

Routers 110 create a separate BFD session for each communications path and data protocol in use between two network devices. For example, to perform fault detection along the entire path between router 110A and 110C, a distinct BFD session may be established along each link 16, e.g., such as a first BFD session between routers 110A and 110B along link 16B and a second BFD session between routers 110B and 110C along link 16C.

In some examples, the use of a dedicated BFD session between two routers may be infeasible. For example, a hub router may be connected to a large number of spoke routers (e.g., dozens, hundreds, or more routers). If such a hub router were to maintain a dedicated BFD session with each spoke router to which the hub router is connected, BFD packets sent and received by the hub router may consume a large amount of network resources. Accordingly, the use of dedicated BFD sessions may consume network resources that could otherwise be used for sending and receiving customer traffic.

In some examples, to reduce the consumption of network resources used for performance monitoring, routers 110 may use in-flow performance monitoring. For example, each router 110 may modify packets carrying customer data for a session between client devices 100 to include metadata comprising performance metrics information. For example, a session between client device 100A and client device 100B comprises a forward flow originating from client device 100A and destined for client device 100B and a reverse flow originating from client device 100B and destined for client device 100A. Router 110A receives, from client device 100A, a first packet of the forward flow, the first packet comprising a header and a data payload. Router 110A modifies the first packet to further include metadata comprising first performance information and forwards the modified first packet to router 110B. Router 110B may obtain the first performance information from the metadata of the first packet. Further, router 110B may remove the metadata and forward the first packet toward client device 100B (e.g., by forwarding the packet to router 110C).

Additionally, router 110B receives, from client device 100B, a second packet of the reverse flow, the second packet comprising a header and a data payload. Router 110B modifies the second packet to further include metadata comprising second performance information and forwards the modified second packet to router 110A. Router 110A may obtain the second performance information from the metadata of the second packet. Further, router 110A may remove the metadata and forward the second packet toward client device 100A.

In some examples, the metadata comprises a BFD packet. In some examples, the metadata comprises a timestamp that routers 110A, 110B may use to determine performance information. In some examples, the metadata comprises a measure of network performance, such as a measure of latency, jitter, packet loss, bandwidth, etc. For example, router 110A modifies a first packet of a forward flow to include metadata specifying a first timestamp indicative of a time at which router 110A forwards the first packet toward router 110B. Router 110B modifies a second packet of a reverse flow to include metadata specifying a second timestamp indicative of a time at which router 110B received the first packet from router 110A and/or a third timestamp indicative of a time at which router 110B forwards the second packet toward router 110A. Router 110A and 110B may exchange a plurality of such modified packets to obtain multiple datapoints regarding the performance of link 16B between router 110A and 110B. Router 110A, for example, may process the multiple timestamps to generate metrics for link 16B between router 110A and 110B, such as latency, jitter, packet loss, bandwidth, etc. In this fashion, routers 110A and 110B may conduct performance monitoring of link 16B without interrupting customer traffic between client devices 100 or consuming additional network resources through the use of dedicated BFD sessions for performance monitoring.

Additional information with respect to performance monitoring is described in U.S. Patent Application Publication No. 2020/0403890, entitled "IN-LINE PERFORMANCE MONITORING," published on Dec. 24, 2020; and U.S. Patent Application Publication No. 10,200,264, entitled "LINK STATUS MONITORING BASED ON PACKET LOSS DETECTION," issued on Feb. 5, 2019, the entire content of each of which is incorporated herein by reference in its entirety.

Session Migration

As described above, routers 110 forward each packet of the forward packet flow of session 40 sequentially and along the same forward network path. Further, routers 110 forward each packet of the reverse packet flow of session 40 sequentially and along the same reverse network path (which may or may not be the same as the forward network path). For example, as depicted in the example of FIG. 1A, router 110A forwards network traffic for a forward packet flow for session 40 to router 110B, which in turn forwards the network traffic for session 40 to router 110C.

However, the path used by routers 110 to forward traffic for session 40 may no longer be suitable due to dynamic changes in customer networks 140 or service provider network 150. The path may become unsuitable, for example, where one of links 16 or an interface of one of routers 110 fails, where a priority of network traffic for session 40 changes, where the performance of the path over which session 40 traverses degrades or fails to meet SLA performance requirements, or where changes in customer networks 140 make the path unsuitable for session 40 (e.g., such as due to a failure of a client gateway).

Therefore, in some examples, routers 110 may modify the path over which mid-stream traffic for session 40 is forwarded. For example, one or more routers 110 may select a different next-hop router 110 to which to forward packets for session 40 or select a different ingress or egress interface with which to send or receive the packets for session 40. As described above, each router generates a session identifier for session 40 that is based on the IP address and port of both the source router and destination router. Therefore, when modifying the path used by session 40, routers 110 may use special handling procedures to ensure that the stateful nature of session 40 is not lost when migrating session 40 to the new path. In some examples, these special handling procedures may include the sharing of metadata between routers of the old path with routers of the new path. This metadata may include, e.g., source and destination IP address and port information of client devices 100A and 100B, respectively, as well as one or more policies, such as network, routing, or security policies, for application to the traffic between client devices 100A and 100B.

In some examples, router 110A maintains an action chain for each flow. The action chain includes a chain descriptor which specifies a status of the flow. The action chain further includes a series of functional blocks, each functional block defining a specific function to be performed as part of routing packets associated with the flow. Router 110 may operate according to each functional block of the action chain so as to effectuate routing of packets for the flow corresponding to the action chain. For example, a functional block of the action chain may specify a routing operation that includes an identification of, e.g., an egress interface of router 110A, an IP address or port of router 110A, a next-hop router 110B, an ingress interface of router 110B, or an IP address or port of router 110B, etc.

Router 110A may modify a path for session 40 so as to migrate session 40 in the following manner. Router 110A deactivates an existing flow for session 40. To deactivate an existing flow for session 40, router 110A modifies the chain descriptor of the action chain for a flow for session 40 to specify that the flow is invalid and/or deactivated, such that router 110A may not use the action chain to forward subsequent packets for the flow. Next, router 110A establishes a new flow for session 40 while the existing flow is deactivated. For example, router 110A may define a new action chain reflecting the changes to session 40. In some examples, while establishing the new flow, router 110A may perform special handling of packets received for the flow, such as buffering the packets, dropping the packets, forwarding the packets to a service path, etc. Router 110A activates the new flow and forwards the received packets for session 40 via the new path for the new flow. For example, to activate the new flow, router 110A may commence handling packets received for the flow in accordance with the new action chain reflecting the changes to the flow. Router 110A may subsequently delete the old action chain that is now invalid and/or deactivated.

In some examples, router 110A may not necessarily be required to notify other routers (e.g., routers 110B and 110C) of the change to the path and/or migration of session 40. As described above, each router 110 generates a session identifier for session 40 that is based on the IP address and port of both the source router and destination router. If, for example, router 110B receives a packet including an unknown session identifier (which may be the case for a packet for a session that is migrated mid-stream), then router 110B may store the session identifier and perform session-based routing of the packet so as to treat the packet as a first packet of a new session.

Routers 110 may modify a path used by the forward packet flow or the reverse packet flow for session 40 in a number of situations. For example, router 110B may modify a packet flow when router 110B receives, from router 110A, a packet for the forward packet flow of session 40 on an incorrect interface of router 110B. In this example, router 110B may modify the forward packet flow as described above so that router 110B receives subsequent packets for the forward packet flow from router 110A on a correct interface.

As another example, routers 110 may modify a packet flow in response to detecting a routing failure. A routing failure may occur, for example, if router 110A detects a failure of link 16B, a failure of an interface of router 110B, or a failure of router 110B (e.g., the next-hop router for the forward packet flow of session 40). In response, for example, router 110A may modify the packet flow by selecting a different router 110 (e.g., such as another hub router not depicted in FIG. 1A) as the next-hop router for the forward packet flow of session 40. As another example, router 110A may modify the packet flow by selecting a different link 16 (not depicted in FIG. 1A) to router 110B or directing the packet flow to a different ingress interface of router 110B. In some examples, routers 110 may use BFD to detect path failures, as described above.

As another example, routers 110 may modify a packet flow in response to a message collision. In some examples, routers 110 may modify the forward and reverse flows of a session so as to define routing policies based on the latest activity (e.g., received packet) received for the session. However, where a first and second router simultaneously transmit a respective first and second packet to one another, and the first router receives the second packet before the second router receives the first packet, the first router may establish a flow for the session based on the second packet. Subsequently, the second router may receive the first packet, which may require the first router to reestablish the flow for the session. In this example, the first router may modify the flow as described above according to routing policies defined by the subsequently received second packet.

In some examples, routers 110 may modify a packet flow in response to detecting additional information related to a network configuration of client devices 100. For example, routers 110 may modify the packet flow in response to detecting the use of Source Network Address Translation (SNAT) by one or more client devices 100.

Additional information with respect to migration of sessions is described in

U.S. Pat. No. 10,841,206, entitled "FLOW MODIFICATION INCLUDING SHARED CONTEXT," issued on Nov. 17, 2020; U.S. Patent Application Publication No. 2021/0036953, entitled "FLOW MODIFICATION INCLUDING SHARED CONTEXT," published on Feb. 4, 2021; U.S. Patent Application Publication No. 2021/0036953, entitled "FLOW MODIFICATION INCLUDING SHARED CONTEXT," published on Feb. 4, 2021; U.S. Pat. No. 10,257,061, entitled "DETECTING SOURCE NETWORK ADDRESS TRANSLATION IN A COMMUNICATION SYSTEM," issued on Apr. 19, 2019; U.S. Provisional Patent Application No. 63/128,672, entitled "NETWORKING DEVICE AND METHOD FOR MODIFYING NETWORK LAYER PATHS IN RESPONSE TO SESSION STATE CHANGES," filed on Dec. 21, 2020; U.S. Pat. No. 10,432,519, entitled "PACKET REDIRECTING ROUTER," issued on Oct. 1, 2019; and U.S. Pat. No. 10,425,511, entitled "METHOD AND APPARATUS FOR MANAGING ROUTING DISRUPTIONS IN A COMPUTER NETWORK," issued on Sep. 24, 2019, the entire content of each of which is incorporated herein by reference in its entirety.

Opportunistic Mesh Networks

In some examples, routers 110 of service provider network 150 are configured to operate in a hub-and-spoke topology. In a hub-and-spoke topology, a hub operates to facilitate communication between spoke site networks.

Some configurations of the hub-and-spoke topology pass all data through a hub, isolating the spoke site networks, and allowing communication between devices within different spoke site networks only through the hub. In an SD-WAN, such as the SD-WAN provided by service provider 150, communication between spoke site networks is facilitated by the hub which, in the case of the SD-WAN, may be provided by a hub device. For example, each router of a hub-and-spoke topology is configured to operate either as a "spoke" (referred to herein as a "spoke router") or a "hub" (referred to herein as a "hub router"). A spoke router may be configured to establish a peering connection with a hub router but not with another spoke router. A hub router may be configured to establish a peering connection with either a spoke router or a hub router.

Typically, each spoke site network within a particular geographic location is connected to a geographically proximate hub. Spoke site networks within the same geographic location are isolated from one another such that traffic passing from a first spoke site network passes through the hub to a second spoke site network. Additionally, a first hub within a first geographic location may communicate with a second hub at a second geographic location, thereby facilitating communication between disparate spoke site networks through chains of inter-connected hubs.

As depicted in the example of FIG. 1A, customer networks 140A and 140B are configured as spoke site networks. For example, routers 110A and 110C operate as edge routers to provide customer networks 140A and 140B access to service provider network 150. Furthermore, routers 110A and 110C are configured to operate as spoke routers. Router 110B is configured to operate as a hub router such that traffic between spoke routers 110A and 110C passes through hub router 110B. Spoke router 110A is connected to hub router 110B via a peering connection along link 16B, and spoke router 110C is connected to hub router 110B via a peering connection along link 16C. To exchange traffic with spoke router 110C, spoke router 110A forwards traffic to and receives traffic from hub router 110B, which functions as an intermediary device between spoke router 110A and spoke router 110C.

In contrast to a hub-and-spoke topology, routers may operate in a mesh topology. In a mesh topology, a mesh router may establish a peering connection with each other mesh router in the network. A mesh topology may provide advantages over a hub-and-spoke topology. For example, communications between two routers in mesh topology may have less latency because such two routers may communicate directly with one another without passing communications through an intermediary hub router. Furthermore, the hub router of a hub-and-spoke topology may suffer scaling issues where the hub router is required to maintain tunnel-based connections with large numbers of spoke devices. However, a mesh network is not without drawbacks in comparison to a hub-and-spoke topology as well. Communication links between two customer edge routers that bypass a hub router may be less reliable than communication links between a customer edge router and a hub router. Furthermore, allowing every router of each customer to communicate with every router of each other customer may present security issues as well as introduce similar scaling issues where each router is required to maintain tunnel-based connections with large numbers of other routers. Full-mesh solutions may be infeasible to implement in tunnel-based networks, such as IPsec tunnel-based networks, due to the overhead and scaling issues introduced by large quantities of tunnels, as well as the set-up times required to establish such tunnels.

As described above, while operating in accordance with the hub-and-spoke topology, a first spoke router may be configured to use routes to a second spoke router that pass through a hub router. However, such routes through the hub router may not be the most desirable. For example, a path from the first spoke router to the second spoke router that bypasses the hub router may include fewer next-hop devices, and therefore provide lower latency or increased performance for routing of the network traffic. Furthermore, for very large numbers of client devices, it may be beneficial to reduce the number of traffic sessions through the hub router to reduce the computational demands on the hub router, thereby improving the scalability of the SD-WAN. Additionally, a path which bypasses the hub router removes the hub router as a point of failure, thereby improving the resiliency of the network. However, because establishing a peering connection between two spoke routers would violate the hub-and-spoke topology, conventional spoke routers may be unable to take advantage of the performance benefits that may be obtained by bypassing a hub router within a hub-and-spoke topology.

In accordance with the techniques of the disclosure, routers 110 of service provider network 150 operate according to a hub-and-spoke topology to form an SD-WAN that provides interconnectivity to customer networks 140 connected to spoke routers 110A, 110C. Each spoke router 110A, 110C is configured to route network traffic through hub router 110B but not through other spoke routers 110. Hub router 110B may route network traffic through spoke routers 110A, 110C or other hub routers (not depicted in FIG. 1A). As described in more detail below, spoke routers 110A, 110C may identify and establish mesh peering connections with one another that bypass hub router 110B on a per-service basis.

As depicted in FIG. 1A, client device 100A of customer network 140A is connected to spoke router 110A and client device 100B of customer network 140B is connected to spoke router 110C. Client device 100A and client device 100B exchange, via service provider network 150, network traffic for a session between client device 100A and client device 100B. In some examples, the session comprises packets of a forward flow originating from client device 100A and destined for client device 100B and packets of a reverse flow originating from client device 100B and destined for client device 100A. For example, spoke router 110A receives, from client device 100A and via link 16A, one or more packets of the forward flow originating from client device 100A and destined for client device 100B. While operating in accordance with the hub-and-spoke topology, spoke router 110A forwards the packets toward client device 100B along a first path comprising link 16B and link 16C. For example, spoke router 110A forwards the packets along link 16B to hub router 110B via the peering connection between spoke router 110A and hub router 110B. Hub router 110B, in turn, forwards the packets along link 16C toward spoke router 110C via the peering connection between hub router 110B and spoke router 110C. Spoke router 110C forwards, via link 16D, the packets of the forward flow to client device 100B.

In accordance with the techniques of the disclosure, spoke router 110A receives a first packet of the plurality of packets of the forward packet flow originating from client device 100A and destined for client device 100B. Spoke router 110A modifies the first packet of the forward packet flow to include metadata specifying first reachability information for the spoke router and first IP address information for spoke router 110A. In some examples, the first reachability information specifies a first tag with which at least a first interface of spoke router 110A is configured. The first tag corresponds to a neighborhood to which the first interface of spoke router 110A is assigned. The first IP address information comprises a first IP address and a first port of spoke router 110A.

Spoke router 110A forwards the modified first packet to hub router 110B. Hub router 110B forwards the modified first packet to spoke router 110C. Spoke router 110C receives, from hub router 110B, the modified first packet. Spoke router 110C stores the metadata of the first packet, and forwards the first packet to client device 100B without the metadata.

In an example where spoke router 110C is connected to service provider network via a bidirectional path, such as a broadband network path, spoke router 110C may share its reachability information and IP address information with spoke router 110A such that spoke router 110A may initiate a peering connection with spoke router 110C. For example, spoke router 110C receives, from client device 100B, a second packet of the plurality of packets of the reverse packet flow. Spoke router 110C modifies the second packet to include metadata specifying second reachability information for spoke router 110C and second IP address information for spoke router 110C. In some examples, the second reachability information specifies a second tag with which at least a second interface of spoke router 110C is configured. The second tag corresponds to a neighborhood to which the second interface of spoke router 110C is assigned. The second IP address information comprises a second IP address and a second port of spoke router 110C.

Spoke router 110C forwards the modified second packet to hub router 110B. Hub router 110B forwards the modified second packet to spoke router 110A. Spoke router 110A receives, from hub router 110B, the modified second packet. Spoke router 110A stores the metadata of the second packet, and forwards the second packet to client device 100A without the metadata.

Spoke router 110A determines that the first reachability information is compatible with the second reachability information. For example, spoke router 110A determines, based on the first reachability information and the second reachability information, that both the first interface of spoke router 110A and the second interface of spoke router 110C are configured with a same tag such that both the first interface of spoke router 110A and the second interface of spoke router 110C are assigned a same neighborhood. Based on the determination that the first reachability information is compatible with the second reachability information, spoke router 110A uses the first IP address information and the second IP address information to initiate a peering connection with spoke router 110C along a first path which bypasses hub router 110B, e.g., along link 16E.

In some examples, spoke router 110A obtains first path quality metrics for the first path to client device 100B through hub router 110B, the first path comprising link 16B and link 16C. In some examples, to obtain the first path quality metrics, routers 110 perform in-flow performance monitoring by injecting path performance information into network traffic for the session between client devices 100A and 100B that routers 110 exchange. In some examples, routers 110 perform in-flow performance monitoring by adding BFD information as metadata to the network traffic for the session between client devices 100A and 100B. By using in-flow performance monitoring, routers 110 may reduce the network requirements of the path quality metrics. For example, performance monitoring techniques that require dedicated packets for performance monitoring to be sent over the network consume network bandwidth of service provider network 150 and computational resources of routers 110 that may otherwise be used for transporting customer traffic. In contrast, the use of in-flow performance monitoring allows customer data traffic to carry such performance monitoring information, thereby eliminating the requirement for dedicated packets for performance monitoring and reducing the overhead of performance monitoring within service provider network 150.

For example, spoke router 110A receives, from client device 100A, packets of the forward flow for the session between client devices 100A and 100B. Spoke router 110A modifies the packets to include metadata comprising a first BFD request for a first BFD session between spoke router 110A and hub router 110B. Spoke router 110A forwards the modified packets to hub router 110B. Spoke router 110A stores the first BFD request for the first BFD session.

Hub router 110B receives the modified packets for the forward flow and removes the metadata comprising the first BFD request for the first BFD session between spoke router 110A and hub router 110B. Hub router 110B further modifies the packets for the forward flow to include metadata comprising a second BFD request for a second BFD session between hub router 110B and spoke router 110C. Hub router 110B forwards the modified packets to spoke router 110C.

Spoke router 110C receives the modified packets for the forward flow and removes the metadata comprising the second BFD request for the second BFD session between hub router 110B and spoke router 110C. Spoke router 110C forwards, to client device 100B, the packets for the forward flow without the metadata. Additionally, spoke router 110C receives, from client device 100B, packets of the reverse flow for the session between client devices 100A and 100B. Spoke router 110C modifies the packets to include metadata comprising a second BFD response for the second BFD session between hub router 110B and spoke router 110C. Spoke router 110C forwards the modified packets to hub router 110B. In some examples, spoke router 110C stores the second BFD request (received from hub router 110B) and the second BFD response (generated by spoke router 110C) for the second BFD session. In some examples, spoke router 110C may send, to central repository 120 of service and topology state information, the second BFD request and the second BFD response for the second BFD session.

Hub router 110B receives the modified packets for the reverse flow and removes the metadata comprising the second BFD response for the second BFD session between hub router 110B and spoke router 110C. Hub router 110B further modifies the packets for the reverse flow to include metadata comprising a first BFD response for the first BFD session between spoke router 110A and hub router 110B. Hub router 110B forwards the modified packets to spoke router 110A. In some examples, hub router 110B stores the first BFD request (received from spoke router 110A) and the first BFD response for the first BFD session (generated by hub router 110B). In some examples, hub router 110B stores the second BFD request (generated by hub router 110B) and the second BFD response (received from spoke router 110C) for the second BFD session. In some examples, hub router 110B may send, to central repository 120 of service and topology state information, the first BFD request and the first BFD response for the first BFD session and the second BFD request and the second BFD response for the second BFD session.

Spoke router 110A receives the modified packets for the reverse flow and removes the metadata comprising the first BFD response for the first BFD session between spoke router 110A and hub router 110B. Spoke router 110A forwards, to client device 100A, the packets for the reverse flow without the metadata. In some examples, spoke router 110A stores the first BFD request (generated by spoke router 110A) and the first BFD response (received from hub router 110B) for the first BFD session. In some examples, spoke router 110A obtains, from the central repository 120, the second BFD request and the second BFD response for the second BFD session (uploaded to central repository 120 by one or more of hub router 110B and spoke router 110C). In some examples, hub router 110B may modify packets for the reverse flow to include both the metadata comprising the first BFD response for the first BFD session and metadata comprising the second BFD request and the second BFD response for the second BFD session.

Spoke router 110A computes, based on the first BFD request and first BFD response for the first BFD session, metrics for link 16B between spoke router 110A and hub router 110B. Further, spoke router 110A computes, based on the second BFD request and second BFD response for the second BFD session, metrics for link 16C between hub router 110B and spoke router 110C. Spoke router 110A computes the first path quality metrics for the first path to client device 100B through hub router 110B based on the metrics for link 16B and the metrics for link 16C. In some examples, the first path quality metrics for the first path to client device 100B through hub router 110B may comprise one or more of a latency, jitter, packet loss, or bandwidth of the first path to client device 100B through hub router 110B.

In the foregoing example, routers 110 use in-flow performance monitoring to obtain the first path quality metrics for the first path through hub device 110B. However, in other examples, routers 110 may use dedicated packets for performance monitoring that are unaffiliated with customer data traffic. For example, instead of modifying packets of the reverse packet flow to include the first BFD response for the first BFD session, hub router 110B may instead transmit a BFD response packet to spoke router 110A that is unaffiliated with customer data traffic. As another example, both spoke router 110A and hub router 110B may exchange BFD packets unaffiliated with customer data traffic to obtain the metrics for link 16B.

Spoke router 110A obtains second path quality metrics for a second path to client device 100B that bypasses hub router 110B. In some examples, the second path to client device 100B bypasses each hub router 110 of service provider network 150. As depicted in FIG. 1A, the second path comprises link 16E between spoke router 110A and spoke router 110C (e.g., and not hub router 110B). In some examples, spoke router 110A obtains the second path quality metrics by establishing a BFD session with spoke router 110C. For example, spoke routers 110A and 110C may exchange BFD packets to obtain metrics for link 16E. In other examples, spoke routers 110A and 110C may exchange dedicated messages comprising timestamp information or other network performance information that enables spoke routers 110A and 110C to derive metrics for link 16E. Spoke router 110A computes the second path quality metrics for the second path that bypasses hub router 110B based on the metrics for link 16E. In some examples, the second path quality metrics for the second path that bypasses hub router 110B may comprise one or more of a latency, jitter, packet loss, or bandwidth of the second path to client device 100B via link 16E.

In the foregoing example, spoke routers 110A and 110C exchange dedicated network performance messages, such as through the use of BFD messages, timestamp messages, or other types of network performance packets. Spoke routers 110A, 110C do not use in-flow performance monitoring to obtain the second path quality metrics for the second path because spoke routers 110A, 110C are not yet exchanging network traffic for the session between client devices 100A and 100B over link 16E. However, in examples where spoke routers 110A and 110C exchange traffic over link 16E (e.g., such as traffic for sessions between other client devices not depicted in FIGS. 1A-1C), spoke routers 110A and 110C may use in-flow performance monitoring as described above so as to reduce the network resource consumption of the performance monitoring.

Spoke router 110A compares the first and second path quality metrics to determine whether to use the second path bypassing hub router 110B for forwarding network traffic for the session between client devices 100A and 100B. For example, spoke router 110A forwards network traffic for the session between client devices 100A and 100B over the second path bypassing hub router 110B in response to determining that the second path bypassing hub router 110B satisfies SLA requirements for the session between client devices 100A and 100B. As another example, spoke router 110A selects the second path bypassing hub router 110B over the first path through hub router 110B in response to determining that the second path bypassing hub router 110B meets or exceeds the performance of the first path through hub router 110B.

As another example, spoke router 110A forwards network traffic for the session between client devices 100A and 100B over the second path bypassing hub router 110B in response to determining that the second path bypassing hub router 110B has a lower cost than a cost of the first path through hub router 110B. In some examples, a "cost" of a path refers to a weighted metric that takes into account a jitter, a packet loss, and a latency of the path. As another example, spoke router 110A forwards network traffic for the session between client devices 100A and 100B over the second path bypassing hub router 110B in response to determining that the second path bypassing hub router 110B both satisfies SLA requirements for the session between client devices 100A and 100B and has a lower cost than a cost of the first path through hub router 110B. In some examples, spoke router 110A forwards network traffic for the session between client devices 100A and 100B over the second path bypassing hub router 110B in response to determining that the second path bypassing hub router 110B both satisfies SLA requirements for the session between client devices 100A and 100B and is cheaper (e.g., has a less expensive monetary cost for use) than a cost of the first path through hub router 110B. For example, a path over a broadband network may be less expensive to an operator than a path over a LTE wireless network, and therefore may be more preferable to use if both the broadband network path and the LTE wireless network path both satisfy SLA requirements for the session between client devices 100A and 100B. In some examples, an administrator may configure the particular parameters that cause spoke router 110A to select the second path bypassing hub router 110B over the first path through hub router 110B.

In response to determining that the second path bypassing hub router 110B satisfies one or more performance requirements for the session between client devices 100A and 100B, spoke router 110A forwards subsequent packets of the forward flow of the session to spoke router 110C via the peering connection, thereby bypassing hub router 110B despite that both spoke router 110A and spoke router 110C are configured as spokes of the hub-and-spoke topology. In the example of FIGS. 1A-1C, the second path along link 16E enables spoke router 110A and spoke router 110C to bypass hub router 110B. Although the techniques of the disclosure describe spoke router 110A and spoke router 110C forming a peering connection that bypasses a single hub router 110B, spoke router 110A and spoke router 110C may form a peering connection that bypasses multiple hub routers 110 (not depicted in FIGS. 1A-1C), or each hub router 110 of service provider network 150 (not depicted in FIGS. 1A-1C).

In some examples, spoke router 110A may migrate network traffic for session 40 forwarded along the first path through link 16B between spoke router 110A and hub router 110B and link 16C between hub router 110B and spoke router 110C to session 40' forwarded along the second path through link 16E between spoke router 110A and spoke router 110C. In some examples, spoke router 110A may use the session migration techniques discussed above to migrate network traffic for session 40 to session 40'.

For example, as depicted in FIG. 1B, spoke router 110A establishes new session 40' for the network traffic between client devices 100A and 100B along link 16E. As described above, spoke router 110A performs session-based routing. Thus, spoke router 110A replaces the header of a first packet for session 40' to specify a source address of spoke router 110A, a source port that is a port via which spoke router 110A forwards the first packet to spoke router 110C, a destination address of spoke router 110C, and a destination port of spoke router 110C to which spoke router 110A forwards the first packet. Further, spoke router 110A modifies the first packet to include metadata specifying the session identifier (e.g., the original source address, source port, destination address, and destination port of the first packet). Spoke router 110A forwards the first packet and subsequent packets of the forward flow for session 40' along the second path to spoke router 110C via link 16E, bypassing hub router 110B.

In some examples, spoke router 110A maintains use of session 40 to enable high availability applications for network traffic for customer devices 100A, 100B. For example, spoke router 110A forwards, to spoke router 110C via the peering connection between spoke router 110A and spoke router 110C, packets of the network traffic between client devices 100A and 100B as described above. Additionally, spoke router 110A duplicates the packets of the network traffic between client devices 100A and 100B. Spoke router 110A and forwards, to hub router 110B, the duplicated packets for forwarding to spoke router 110C. Spoke router 110C receives both the packets for session 40' from spoke router 110A and the duplicated packets for session 40 from hub router 110B. Spoke router 110C may use the redundant packet flows to reconstitute packets lost from either session 40 or session 40' so as to provide high availability for the network traffic exchanged between client devices 100A and 100B.

In some examples, spoke router 110A may maintain use of session 40 instead of migrating the network traffic for session 40 to session 40' forwarded along the second path through link 16E between spoke router 110A and spoke router 110C. In this example, spoke router 110A determines that hub router 110B has failed or provides inadequate performance. In response to determining that hub router 110B has failed or provides inadequate performance, spoke router 110A migrates the network traffic of session 40 to session 40' forwarded along the second path through link 16E between spoke router 110A and spoke router 110C. Spoke router 110A may continue to use session 40' for network traffic between client devices 100 until the performance of hub router 110B improves or hub router 110B comes back online or until spoke router 110A identifies another path providing better network performance than the second path to spoke router 110C. In some examples, spoke router 110A provides, as a configuration option, the ability to migrate the network traffic for the session between client devices 100 from session 40 to session 40' in response to failure of hub router 110B, which may be selected by an administrator.

In the previous example, spoke router 110C is connected to service provider network via a bidirectional path such that spoke router 110A may initiate a peering connection with spoke router 110C. In another example where spoke router 110C is connected to service provider network via a unidirectional path, such as an LTE network path, the unidirectional path may prevent spoke router 110A from initiating the peering connection with spoke router 110C. Therefore, in this example, spoke router 110C does not forward a second packet to spoke router 110A that includes the second reachability information and second IP address information for spoke router 110C, as described in the previous example. Instead, in this example, spoke router 110C initiates the peering connection with spoke router 110A using the metadata of the first packet.

For example, in response to receiving the first packet including the metadata specifying the first reachability information and the first IP address information for spoke router 110A, spoke router 110C determines that the first reachability information is compatible with second reachability information for spoke router 110C. In some examples, the second reachability information specifies a second tag with which at least a second interface of spoke router 110C is configured. The second tag corresponds to a neighborhood to which the second interface of spoke router 110C is assigned. For example, spoke router 110A determines, based on the first reachability information and the second reachability information, that both the first interface of spoke router 110A and the second interface of spoke router 110C are configured with a same tag such that both the first interface of spoke router 110A and the second interface of spoke router 110C are assigned a same neighborhood.

Based on the determination that the first reachability information is compatible with the second reachability information, spoke router 110C uses the first IP address information and second IP address information for spoke router 110C to initiate a peering connection with spoke router 110A along a first path which bypasses hub router 110B, e.g., along link 16E. The second IP address information comprises a second IP address and a second port of spoke router 110C.

In some examples, spoke router 110C determines one or more first path quality metrics for the first path which bypasses hub router 110B and one or more second path quality metrics for a second path from spoke router 110C, through hub router 110B, to spoke router 110A. For example, the first and second path quality metrics are one or more of a latency, jitter, packet loss, or bandwidth of the first and second path, respectively. In some examples, spoke router 110A, hub router 110B, and spoke router 110C may inject path quality metrics into the network traffic for the session between client devices 100A, 110B prior to forwarding the network traffic so as to reduce the network requirements of the path quality metrics. Spoke router 110C compares the first and second path quality metrics to determine if the path bypassing hub router 110B meets or exceeds performance requirements in comparison to the path through hub router 110B.

In response to determining that the one or more first path quality metrics meet or exceed the second path quality metrics and/or one or more SLA requirements for the session, spoke router 110C forwards, to spoke router 110A, and along the path which bypasses hub router 110B, subsequent packets of the reverse packet flow. For example, spoke router 110C may forward the subsequent packets of the reverse packet flow along the path which bypasses hub router 110B in response to determining that the path which bypasses hub router 110B provides the same or better performance than the path through hub router 110B. In addition or alternatively, spoke router 110C may forward the subsequent packets of the reverse packet flow along the path which bypasses hub router 110B in response to determining that the path which bypasses hub router 110B meets or exceeds SLA requirements for the session between client devices 100A and 100B. In response to receiving from spoke router 110C, the subsequent packets of the reverse packet flow along the path which bypasses hub router 110B, spoke router 110A forwards, to spoke router 110C, and along the path which bypasses hub router 110B, subsequent packets of the forward packet flow.

Additional information with respect to session-based routing with flow duplication is described in U.S. Pat. No. 10,833,980, entitled "ROUTER DEVICE USING FLOW DUPLICATION," issued on Nov. 10, 2020; U.S. Patent Application Publication No 2021/0203592, entitled "ROUTER DEVICE USING FLOW DUPLICATION," published on Jul. 1, 2020; and U.S. patent application Ser. No. 17/301,364, entitled "ROUTER DEVICE USING FLOW DUPLICATION," filed on Mar. 31, 2021, the entire content of each of which is incorporated herein by reference in its entirety.

In some examples, spoke router 110A may maintain session 40 for use in failover operations. For example, spoke router 110A may migrate the network traffic between client devices 100A and 100B from session 40' bypassing hub router 110B back to session 40 through hub router 110B in response to determining that performance of session 40' (e.g., the path quality of link 16E) degrades below SLA requirements for the network traffic between client devices 100A and 100B.

In some examples, as depicted in FIG. 1C, spoke router 110A deactivates session 40. By deactivating session 40, spoke router 110A may reduce the number of peering connections to hub router 110B. As described above, by reducing the number of peering connections to hub router 110B, spoke routers 110 within service provider network 150 may reduce the network resource and computational demands on hub router 110B, thereby increasing the number of spoke routers 110 that hub router 110B may support and increasing the scalability and flexibility of service provider network 150.

In the example of FIGS. 1A-1C, service provider network 150 includes a single hub router 110B for ease of illustration. However, the techniques of the disclosure may be applied to many different network topologies, such as networks that include a single hub router or many hub routers. As an example where service provider network 150 includes a plurality of hub routers, each spoke router 110 typically operates as an ingress router to provide SD-WAN interconnectivity for customer networks within a particular geographic region. For example, a first spoke router may be configured to route network traffic through a first hub router of a plurality of hub routers. The first spoke router and the first hub router provide SD-WAN interconnectivity to a first customer network that is within a first geographic region. A second spoke router is configured to route network traffic through a second hub router of the plurality of hub routers. The second spoke router and the second hub router provide SD-WAN interconnectivity to a second customer network that is within a second geographic region different from the first geographic region. The first hub router and the second hub router are configured to route traffic to one another so as to provide SD-WAN interconnectivity between the first and second geographic regions. Using the techniques described herein, the first spoke router and the second spoke router may form a peering connection with one another so as to bypass the first hub router, the second hub router, or both the first and second hub routers. The techniques described herein may enable the first and second spoke routers to form peering connections that bypass any number of the plurality of hub routers within service provider network 150.

As another example wherein service provider network 150 includes multiple hub routers, the techniques of the disclosure may enable spoke router 110A be used to select a new hub router from a list of multiple hub routers 110. In some examples, the list of multiple hub routers is a list of hub routers within the geographic region of spoke router 110A. For example, spoke router 110A may obtain path quality metrics for a first path using a first hub router and a second path using a second hub router. Spoke router 110A may use the path quality metrics to select between the first and second paths thereby selecting between the first and second hub routers. Spoke router 110A may thereafter establish a peering connection with the selected first or second hub router and forward network traffic for client devices 100 to the selected hub router.

Figure 2:
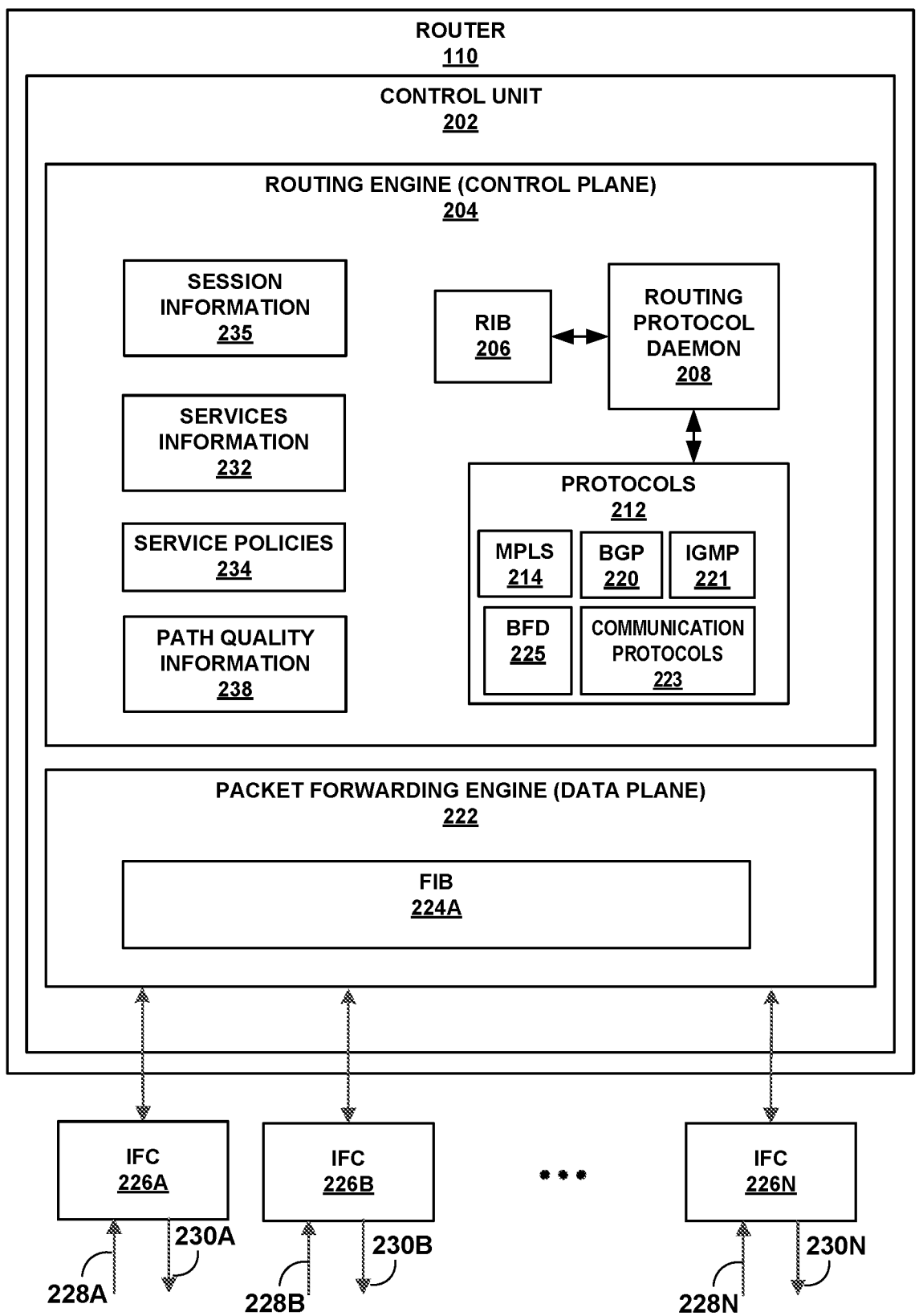
FIG. 2 is a block diagram illustrating an example router in accordance with the techniques of the disclosure.

FIG. 2 is a block diagram illustrating an example router 110 in accordance with the techniques of the disclosure. In general, router 110 may be an example of one of routers 110 of FIGS. 1A-1C. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIGS. 1A-1C, to establish and maintain a computer network, such as computer network system 2 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols, such as TCP, UDP, TLS, or ICMP. Protocols 212 may also include one or more performance monitoring protocols, such as BFD 225.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100A and destined for client device 100B of FIGS. 1A-1C, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, router 110 operates as spoke router 110A of FIGS. 1A-1C to identify and establish a mesh peering connection with another spoke router 110 (e.g., spoke router 110C of FIGS. 1A-1C) to bypass hub router 110B. For example, control unit 202 receives, from client device 100A of FIGS. 1A-1C and via IFCs 226, one or more packets of a forward flow originating from client device 100A and destined for client device 100B. In some examples, control unit 202 may obtain, from central repository 120, one or more routes toward client device 100B. For example, as described above, control unit 202 of router 110 may exchange service and topology state information with central repository 120. Control unit 202 transits, to central repository 120, a JSON document specifying service and topology state information for router 110. The service and topology state information for router 110 includes one or more routes reachable to router 110. Further, control unit 202 receives, from central repository 120 and for each other router 110 of service provider network 150 to which router 110 is subscribed, a JSON document specifying service and topology state information for the other routers 110. In some examples, the service and topology state information for each other router 110 may include one or more routes reachable to the other routers 110. The one or more routes may include a first route toward client device 100B specifying hub router 110B as a next hop via link 16B, and a second route toward client device 100B specifying spoke router 110C as a next hop via link 16E. The first route traverses a first path comprising link 16B to hub router 110B, and link 16C to spoke router 110C. The second route traverses a second path comprising link 16E to spoke router 110C. In some examples, control unit 202 may obtain the one or more routers using other means, such as via IGMP or BGP. Control unit 202 stores the first and second routers in RIB 206. While operating in accordance with the hub-and-spoke topology, control unit 202 forwards the packets toward client device 100B via the first route to hub router 110B.

In accordance with the techniques of the disclosure, control unit 202 receives a first packet of the plurality of packets of the forward packet flow originating from client device 100A of FIG. 1 and destined for client device 100B of FIG. 1. Control unit 202 modifies the first packet of the forward packet flow to include metadata specifying first reachability information for the spoke router and first IP address information for router 110. In some examples, the first reachability information specifies a first tag with which at least a first interface of spoke router 110A is configured. The first tag corresponds to a neighborhood to which the first interface 226A of router 110 is assigned. The first IP address information comprises a first IP address and a first port of first interface 226A.

Control unit 202 forwards the modified first packet to hub router 110B of FIG. 1. Hub router 110B forwards the modified first packet to, e.g., spoke router 110C of FIG. 1. Spoke router 110C receives, from hub router 110B, the modified first packet. Spoke router 110C stores the metadata of the first packet, and forwards the first packet to client device 100B without the metadata.

Control unit 202 receives, via IFCs 226 and from hub router 110B, a second packet of the plurality of packets of a reverse packet flow for the session between client devices 100A and 100B. The second packet includes metadata specifying second reachability information for spoke router 110C and second IP address information for spoke router 110C. In some examples, the second reachability information specifies a second tag with which at least a second interface of spoke router 110C is configured. The second tag corresponds to a neighborhood to which the second interface of spoke router 110C is assigned. The second IP address information comprises a second IP address and a second port of spoke router 110C. Control unit 202 stores the metadata of the second packet, and forwards the second packet to client device 100A without the metadata.

Control unit 202 determines that the first reachability information of router 110 is compatible with the second reachability information. For example, control unit 202 determines, based on the first reachability information and the second reachability information, that both the first interface 226A of router 110 and the second interface of spoke router 110C are configured with a same tag such that both first interface 226A of router 110 and the second interface of spoke router 110C are assigned a same neighborhood. Based on the determination that the first reachability information is compatible with the second reachability information, control unit 202 uses the first IP address information and the second IP address information to initiate a peering connection with spoke router 110C along a first path which bypasses hub router 110B, e.g., along link 16E of FIG. 1.

Control unit 202 obtains first path quality metrics for the first path to client device 100B through hub router 110B, the first path comprising link 16B and link 16C. In some examples, to obtain the first path quality metrics, control unit 202 performs in-flow performance monitoring by injecting path performance information into packets of the forward flow for the session forwarded to hub router 110B. In some examples, control unit 202 performs in-flow performance monitoring by adding BFD information as metadata to packets of the forward flow for the session which control unit 202 forwards to hub router 110B.

For example, control unit 202 receives, from client device 100A and via IFCs 226, packets of the forward flow for the session between client devices 100A and 100B. Control unit 202 modifies the packets to include metadata comprising a first BFD request for a first BFD session between spoke router 110A and hub router 110B. Control unit 202 forwards, via IFCs 226, the modified packets to hub router 110B. Control unit 202, receives, from hub router 110B and via IFCs 226, one or more packets for the reverse flow that comprise metadata specifying a first BFD response for the first BFD session. Control unit 202 stores, in path quality information 238, the first BFD request and the first BFD response for the first BFD session. Control unit 202 removes the metadata from the one or more packets for the reverse flow and forwards, via at least one of IFCs 226 to client device 100A, the packets for the reverse flow without the metadata.

In some examples, control unit 202 obtains, from the central repository 120, BFD information for each link 16 along the first path to client device 100B. For example, control unit 202 obtains, from the central repository 120, a second BFD request and a second BFD response for a second BFD session between hub router 110B and spoke router 110C. In other examples, the one or more packets for the reverse flow received by control unit 202 comprise metadata specifying both BFD information for the first BFD session and BFD information for each link 16 along the first path to client device 100B. Control unit 202 stores, in path quality information 238, the BFD information for each link 16 along the first path to client device 100B.

Control unit 202 computes, based on the first BFD request and first BFD response for the first BFD session, metrics for link 16B between spoke router 110A and hub router 110B. Control unit 202 computes, based on the second BFD request and second BFD response for the second BFD session, metrics for link 16C between hub router 110B and spoke router 110C. Control unit 202 computes the first path quality metrics for the first path to client device 100B through hub router 110B based on the metrics for link 16B and the metrics for link 16C. In some examples, the first path quality metrics for the first path to client device 100B through hub router 110B may comprise one or more of a latency, jitter, packet loss, or bandwidth of the first path to client device 100B through hub router 110B.

In the foregoing example, control unit 202 uses in-flow performance monitoring to obtain the first path quality metrics for the first path through hub device 110B. However, in other examples, control unit 202 may use dedicated packets for performance monitoring that are unaffiliated with customer data traffic. For example, instead of modifying packets of the forward packet flow to include the first BFD request for the first BFD session, control unit 202 may instead exchange BFD packets unaffiliated with customer data traffic to obtain the metrics for link 16B in accordance with BFD protocol 225.

Control unit 202 obtains second path quality metrics for the second path to client device 100B that bypasses hub router 110B. In some examples, control unit 202 obtains the second path quality metrics by establishing a BFD session with spoke router 110C. For example, control unit 202 exchanges BFD packets with spoke router 110C to obtain metrics for link 16E. Control unit 202 computes the second path quality metrics for the second path that bypasses hub router 110B based on the metrics for link 16E. In some examples, the second path quality metrics for the second path that bypasses hub router 110B may comprise one or more of a latency, jitter, packet loss, or bandwidth of the second path to client device 100B via link 16E.

In some examples, in-flow performance monitoring is not used to obtain the second path quality metrics for the second path because control unit 202 is not yet exchanging network traffic for the session between client devices 100A and 100B with spoke router 110C over link 16E. However, in examples where spoke routers 110A and 110C exchange traffic over link 16E (e.g., such as traffic for sessions between other client devices), control unit 202 may use in-flow performance monitoring as described above so as to reduce the network resource consumption of the performance monitoring.

In some examples, control unit 202 determines a first aggregate path quality metric for the first path and a second aggregate path quality metric for the second path. For example, control unit 202 may determine the aggregate metric for a path based on multiple metrics for a path, such as latency, jitter, packet loss, or bandwidth for the path. In this example, control unit 202 weights each different metric for the path to determine an aggregate metric representative of an overall quality of the path. As another example, control unit 202 may determine the aggregate metric based on a single a metric obtained for each link forming the path. In this example, control unit 202 may determine the aggregate metric as a minimum, average, or maximum of the metric obtained for each link of the plurality of links forming the path. For example, where control unit 202 determines a bandwidth of each link forming the path, control unit 202 may determine the aggregate metric for the path to be a bandwidth that is the same as a link having the least amount of bandwidth of any link forming the path.

Control unit 202 compares the first and second path quality metrics to determine whether the second path bypassing hub router 110B is to be used for forwarding network traffic for the session between client devices 100A and 100B. For example, control unit 202 forwards network traffic for the session between client devices 100A and 100B over the second path bypassing hub router 110B in response to determining that the second path bypassing hub router 110B satisfies SLA requirements for the session between client devices 100A and 100B. As another example, control unit 202 forwards network traffic for the session between client devices 100A and 100B over the second path bypassing hub router 110B in response to determining that the second path bypassing hub router 110B meets or exceeds the performance of the first path through hub router 110B. In some examples, control unit 202 compares a first aggregate path quality metric for the first path and a second aggregate path quality metric for the second path to determine whether the second path bypassing hub router 110B is to be used for forwarding network traffic for the session between client devices 100A and 100B.

In some examples, an administrator may configure spoke router 110A with a maximum number of spoke-spoke connections. For example, when determining whether the second path bypassing hub router 110B is to be used for forwarding network traffic for the session between client devices 100A and 100B, control unit 202 may determine whether the peering connection would exceed a maximum number of connections that spoke router 110A may establish with other spoke routers 110. In response to determining that the peering connection with spoke router 110C does not exceed a maximum number of connections spoke router 110A may establish with other spoke routers 110, control unit 202 forms the peering connection with spoke router 110C along the second path which bypasses the plurality of hub router. If the peering connection with spoke router 110C would exceed the maximum number of connections spoke router 110A may establish with other spoke routers 110, then control unit 202 may not form the peering connection and maintains use of the first path through hub router 110B, even where the peering connection with spoke router 110C may be more preferable over use of the first path through hub router 110B.

In some examples, other circumstances may cause spoke router 110A to maintain use of the first path through hub router 110B, even where the peering connection with spoke router 110C may be more preferable over use of the first path through hub router 110B. For example, to form the peering connection with spoke router 110C, both spoke router 110A and spoke router 110C should agree to use the peering connection. Even if the peering connection would not exceed a maximum number of connections for spoke router 110A, such a peering connection may exceed a maximum number of connections for spoke router 110C such that spoke router 110C does not agree to establish the peering connection.

As another example, spoke router 110A may have multiple types of WAN interfaces, such as one or more interfaces connected to a broadband network and one or more interfaces connected to an LTE wireless network. Data traffic over the broadband network may be cheaper, while the LTE wireless network may be more expensive (or charge on a per-volume basis). In some examples, spoke router 110A may be configured to implement the techniques disclosed herein for dynamic meshing only on a subset of interfaces, such as only those interfaces connected to the broadband network.

In response to determining that the second path bypassing hub router 110B satisfies one or more performance requirements for the session between client devices 100A and 100B, control unit 202 forwards subsequent network traffic for the session to spoke router 110C via the peering connection, thereby bypassing hub router 110B despite that both spoke router 110A and spoke router 110C are configured as spokes of the hub-and-spoke topology.

In some examples, control unit 202 may migrate network traffic for session 40 forwarded along the first path through link 16B between spoke router 110A and hub router 110B and link 16C between hub router 110B and spoke router 110C to session 40' forwarded along the second path through link 16E between spoke router 110A and spoke router 110C. In some examples, control unit 202 may use the session migration techniques discussed above to migrate network traffic for session 40 to session 40'. In some examples, the evaluation of the path quality of the second path may require some time to occur (e.g., several seconds). Therefore, in such an example, control unit 202 may migrate network traffic for session 40 to session 40' after expiration of a predetermined amount of time (e.g., several seconds) after establishing the peering connection with spoke router 110C. In some examples, an administrator may configure the amount of time control unit 202 waits after establishing the peering connection with spoke router 110C before migrate network traffic for session 40 to session 40'.

In some examples, control unit 202 may use an Interactive Connectivity Establishment (ICE) request to signal to spoke router 110C the migration of session 40 along the first path through hub router 110B to session 40' forwarded along the second path through link 16E to spoke router 110C. ICE provides a mechanism for spoke routers 110A, 110C to identify a direct peer-to-peer connection, even where spoke routers 110A, 110C are unaware of their network topologies. ICE may be useful when one or more Network Address Translation (NAT) devices or firewalls are interposed between spoke routers 110A and 110C. ICE makes use of the Session Traversal Utilities for NAT (STUN) protocol and its extension, Traversal Using Relay NAT (TURN).

For example, where spoke router 110A is behind a NAT device, control unit 202 of spoke router 110A may request, from a STUN server or TURN server, a public address for spoke router 110A with which spoke router 110C may use to reach spoke router 110A. Control unit 202 of spoke router 110A sends the public address for spoke router 110A to spoke router 110C over the first path. For example, control unit 202 of spoke router 110A forwards, to hub router 110B, an ICE request destined for spoke router 110C, the ICE request specifying a public IP address for spoke router 110A. Further, control unit 202 receives, from hub router 110B an ICE response originating from spoke router 110C, the ICE response specifying a public IP address for spoke router

110C. In other examples, spoke routers 110A and 110C may attach metadata specifying the ICE request and/or ICE response (and the public IP address for the respective spoke router 110A, 110C) to network traffic for the session between client devices 100A, 100B prior to forwarding the network traffic to hub router 110B.

In response to receiving the ICE response, control unit 202 forms a peering connection with spoke router 110C along the second path which bypasses hub router 110B. For example, in response to obtaining a public address for spoke router 110C, control unit 202 performs a connectivity check for the second path along link 16E between spoke routers 110A and 110C. The connectivity check comprises a 4-way handshake wherein spoke router 110A transmits a STUN request to spoke router 110C, spoke router 110A receives a STUN response from spoke router 110C, spoke router 110C transmits a STUN request to spoke router 110A, and spoke router 110C receives a STUN response from spoke router 110A. If the 4-way handshake succeeds, spoke routers 110A and 110C may commence exchanging network traffic along the second path, thereby bypassing hub router 110B.

Additional example information regarding ICE is described in "Interactive Connectivity Establishment (ICE): A Protocol for Network Address Translator (NAT) Traversal," RFC 8445, IETF, July 2018, available at https://datatracker.ietf.org/doc/html/rfc8445, the entire contents of which are incorporated herein by reference. Additional example information regarding STUN is described in "Session Traversal Utilities for NAT (STUN)," RFC 5389, IETF, October 2008, available at https://datatracker.ietf.org/doc/html/rfc5389, the entire contents of which are incorporated herein by reference. Additional example information regarding TURN is described in "Traversal Using Relays around NAT (TURN): Relay Extensions to Session Traversal Utilities for NAT (STUN)," RFC 5766, IETF, April 2010, available at https://www.rfc-editor.org/rfc/rfc5766.html, the entire contents of which are incorporated herein by reference.

As another example, control unit 202 may publish, to central repository 120, service and topology state information including an IP address for each IFC 226 of router 110. Furthermore, control unit 202 may receive, from central repository 120, service and topology state information including a public IP address for one or more interfaces of spoke router 110C. Control unit 202 may thereafter use the public IP address(es) obtained for spoke router 110C to negotiate with spoke router 110C the migration of session 40 along the first path through hub router 110B to session 40' forwarded along the second path through link 16E to spoke router 110C.

In some examples, spoke routers 110A and 110C use TCP simultaneous open to form the peering connection along the second path which bypasses hub router 110B. TCP simultaneous open may occur when both spoke routers 110A and 110C attempt to initialize a TCP handshake at substantially the same time. For example, control unit 202 sends, to spoke router 110C and along the second path, a first packet comprising a first TCP SYN message. Furthermore, control unit 202 receives, from spoke router 110C and along the second path, a second packet comprising a second TCP SYN message. Control unit 202 sends, to spoke router 110C and along the second path, a third packet comprising a first TCP SYN-ACK message responsive to the second TCP SYN message. Furthermore, control unit 202 receives, from spoke router 110C and along the second path, a fourth packet comprising a second TCP SYN-ACK message responsive to the first TCP SYN message. Control unit 202 may consider the session between spoke router 110A and 110C to be established upon receiving the second TCP SYN-ACK responsive to the TCP SYN message sent by control unit 202. Further, spoke router 110C may consider the session between spoke router 110A and 110C to be established upon receiving the first TCP SYN-ACK responsive to the TCP SYN message sent by spoke router 110C.

Additional example information regarding TCP Simultaneous Open is described in "NAT Behavioral Requirements for TCP," RFC 5382, IETF, October 2008, available at https://datatracker.ietf.org/doc/html/rfc5382, the entire contents of which are incorporated herein by reference.

In some examples, control unit 202 may periodically collect the path quality metrics for the first and second path to determine whether or not to continue use of the second path bypassing hub router 110B for traffic of session 40. For example, in response to determining that the performance of the second path has deteriorated or does not meet SLA requirements for session 40, control unit 202 may migrate session 40 between client devices 100A and 100B back to use of the first path through hub router 110B.

In some examples, control unit 202 may store the second path as a route in RIB 206. Control unit 202 may retrieve the route from RIB 206 for use in forwarding traffic for sessions between client devices other than client devices 100A, 100B. In this manner, control unit 202 may establish the second path to spoke router 110C which bypasses hub router 110B and forward traffic for a first session between client devices 100 along the second path. Subsequently, control unit 202 may forward, to spoke router 110C along the second path, traffic for a second session between different client devices 100, thereby bypassing hub router 110B without requiring spoke router 110A to reevaluate the path quality metrics for the first path through hub router 110B and the second path bypassing hub router 110B.

As another example, control unit 202 may forward, to hub router 110B, traffic for a third session between different client devices 100 that has been established prior to the establishment of the first session. In some examples, this pre-existing third session may not have been migrated to use of the second path because of previous poor path performance of the second path or because using the second path may have exceeded a maximum number of permitted spoke-spoke connections. Regardless of the reason, after identifying the second path for use in forwarding traffic for the first session, control unit 202 may additionally retrieve the route from RIB 206 for use in forwarding the traffic for the third session between client devices 100 along the second path.

In some examples, control unit 202 may periodically remove paths and/or peering connections to other spoke routers 110 that are not in use. For example, control unit 202 may store a route corresponding to the second path to spoke router 110C in RIB 206. Control unit 202 determines whether spoke router 110A has sent or received network traffic for the session between client devices 100A and 100B via the peering connection to spoke router 110C within a predetermined amount of time. In some examples, the predetermined amount of time is about 5 minutes. In response to determining that that spoke router 110A has not sent or received network traffic for the session between client devices 100A and 100B via the second path to spoke router 110C for the predetermined amount of time, control unit 202 deletes the route for the second path from RIB 206. Therefore, upon receiving subsequent network traffic for the session between client devices 100A and 100B, control unit 202 may forward the network traffic to hub router 110B for forwarding to spoke router 110C. Control unit 202 may additionally collect the path quality metrics for the first and second path again to determine whether or not to establish the peering connection to spoke router 110C and commence use of the second path so as to bypass hub router 110B as described above.

Elements of control unit 202 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 110, e.g., protocols. Control unit 202, in some examples, retrieves and executes the instructions from memory for these aspects.

Figure 3:
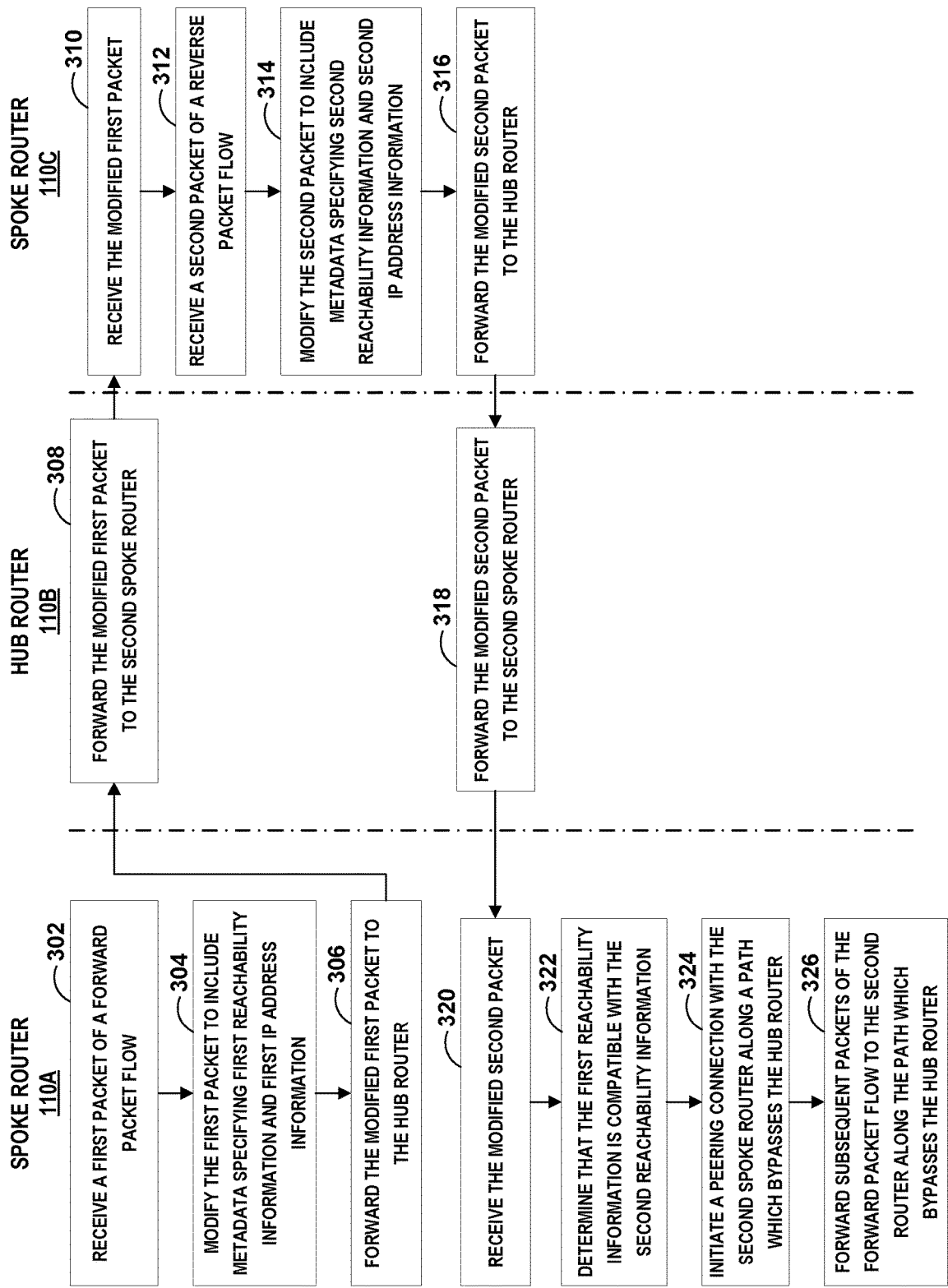
FIG. 3 is a flowchart illustrating an example operation in accordance with the techniques of the disclosure.

FIG. 3 is a flowchart illustrating an example operation in accordance with the techniques of the disclosure. Specifically, FIG. 3 illustrates an operation wherein spoke router 110A of a plurality of routers 110 operating according to a hub-and-spoke topology to form an SD-WAN, identifies and establishes a mesh peering connection with spoke router 110C so as to bypass hub router 110B. FIG. 3 is described with respect to FIGS. 1A-1C for convenience. In the example of FIG. 3, spoke router 110C is connected to service provider network 150 via a bidirectional path, such as via a broadband network connection.

First spoke router 110A receives a first packet of a plurality of packets of a forward packet flow originating from first client device 100A and destined for second client device 100B (302). A session between first client device 100A and second client device 100B includes the forward packet flow and a reverse packet flow originating from the second client device and destined for the first client device.

First spoke router 110A modifies the first packet of the forward packet flow to include metadata specifying first reachability information for the first spoke router and first IP address information for first spoke router 110A (304). In some examples, the first reachability information specifies a first tag with which at least a first interface of first spoke router 110A is configured. The first tag corresponds to a neighborhood to which the first interface of first spoke router 110A is assigned. The first IP address information comprises a first IP address and a first port of first spoke router 110A. First spoke router 110A forwards the modified first packet to hub router 110B (306).

Hub router 110B forwards the modified first packet to second spoke router 110C (308). Second spoke router 110C receives, from hub router 110B, the modified first packet (310). Second spoke router 110C stores the metadata of the first packet, and forwards the first packet to client device 100B without the metadata.

Second spoke router 110C receives, from client device 100B, a second packet of the plurality of packets of the reverse packet flow (312). Second spoke router 110C modifies the second packet to include metadata specifying second reachability information for second spoke router 110C and second IP address information for second spoke router 110C (314). In some examples, the second reachability information specifies a second tag with which at least a second interface of second spoke router 110C is configured. The second tag corresponds to a neighborhood to which the second interface of second spoke router 110C is assigned. The second IP address information comprises a second IP address and a second port of second spoke router 110C. Second spoke router 110C forwards the modified second packet to hub router 110B (316). Hub router 110B forwards the modified second packet to first spoke router 110A (318).

First spoke router 110A receives, from hub router 110B, the modified second packet (320). First spoke router 110A stores the metadata of the second packet, and forwards the second packet to client device 100A without the metadata.

First spoke router 110A determines that the first reachability information is compatible with the second reachability information (322). For example, first spoke router 110A determines, based on the first reachability information and the second reachability information, that both the first interface of first spoke router 110A and the second interface of second spoke router 110C are configured with a same tag such that both the first interface of first spoke router 110A and the second interface of second spoke router 110C are assigned a same neighborhood. Based on the determination that the first reachability information is compatible with the second reachability information, first spoke router 110A uses the first IP address information and the second IP address information to initiate a peering connection with second spoke router 110C along a first path which bypasses hub router 110B, e.g., along link 16E (324).

In some examples, first spoke router 110A determines one or more first path quality metrics for the first path which bypasses hub router 110B and one or more second path quality metrics for a second path from first spoke router 110A, through hub router 110B, to second spoke router 110C. For example, the first and second path quality metrics are one or more of a latency, jitter, packet loss, or bandwidth of the first and second path, respectively. In some examples, first spoke router 110A, hub router 110B, and second spoke router 110C may inject path quality metrics into the network traffic for the session between client devices 100A, 110B prior to forwarding the network traffic so as to reduce the network requirements of the path quality metrics. First spoke router 110A compares the first and second path quality metrics to determine if the path bypassing hub router 110B meets or exceeds performance requirements in comparison to the path through hub router 110B.

In response to determining that the one or more first path quality metrics meet or exceed the second path quality metrics and/or one or more SLA requirements for the session, first spoke router 110A forwards, to second spoke router 110C, and along the path which bypasses hub router 110B, subsequent packets of the forward packet flow (326). For example, first spoke router 110A may forward the subsequent packets of the forward packet flow along the path which bypasses hub router 110B in response to determining that the path which bypasses hub router 110B provides the same or better performance than the path through hub router 110B. In addition or alternatively, first spoke router 110A may forward the subsequent packets of the forward packet flow along the path which bypasses hub router 110B in response to determining that the path which bypasses hub router 110B meets or exceeds SLA requirements for the session between client devices 100A and 100B.

Figure 4:
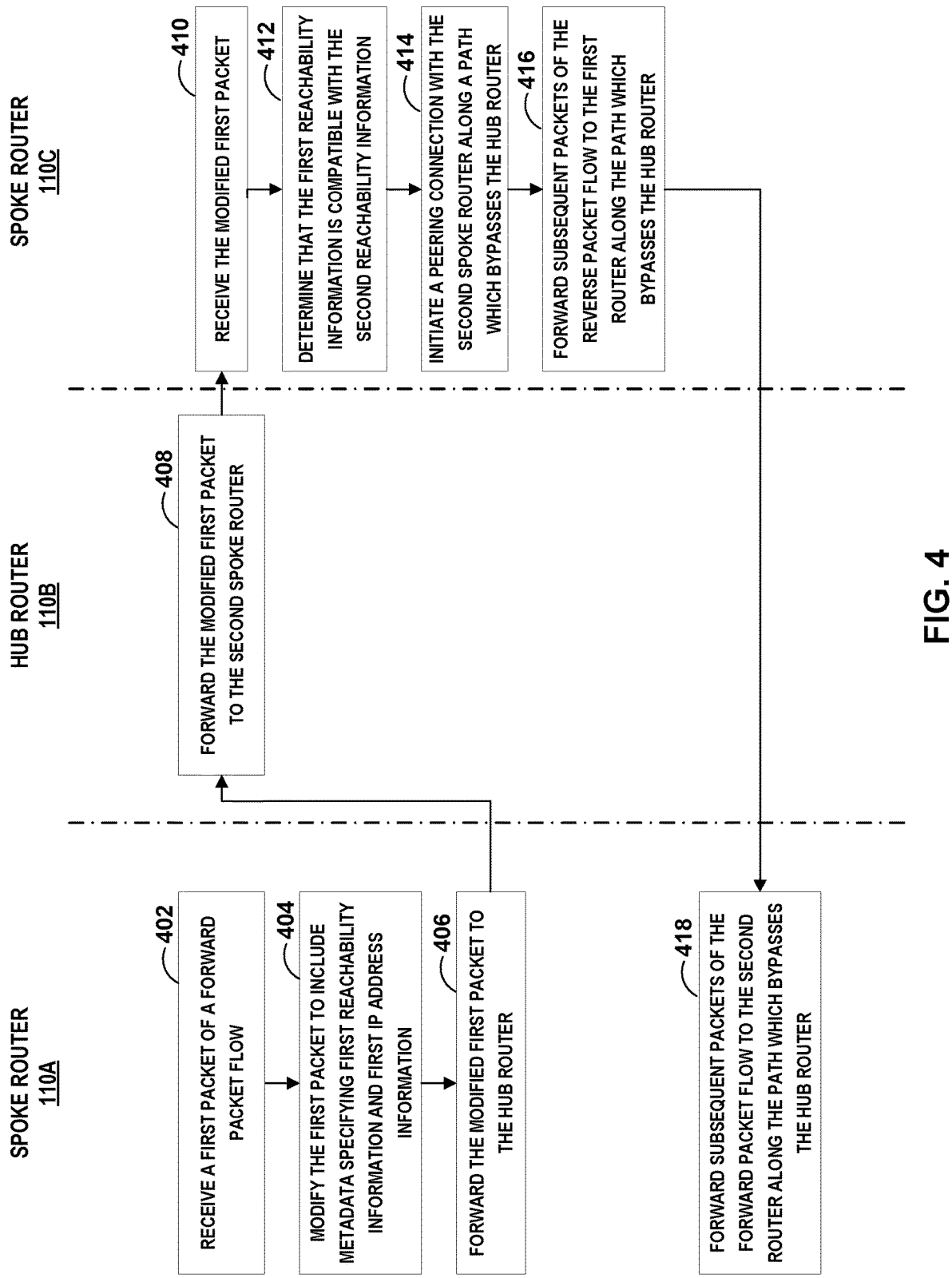
FIG. 4 is a flowchart illustrating another example operation in accordance with the techniques of the disclosure.

FIG. 4 is a flowchart illustrating another example operation in accordance with the techniques of the disclosure. Specifically, FIG. 4 illustrates an operation wherein spoke router 110A of a plurality of routers 110 operating according to a hub-and-spoke topology to form an SD-WAN, identifies and establishes a mesh peering connection with spoke router 110C so as to bypass hub router 110B. FIG. 4 is described with respect to FIGS. 1A-1C for convenience. In the example of FIG. 3, spoke router 110C is connected to service provider network 150 via a unidirectional path, such as an LTE network path.

First spoke router 110A receives a first packet of a plurality of packets of a forward packet flow originating from first client device 100A and destined for second client device 100B (402). A session between first client device 100A and second client device 100B includes the forward packet flow and a reverse packet flow originating from the second client device and destined for the first client device.

First spoke router 110A modifies the first packet of the forward packet flow to include metadata specifying first reachability information for the first spoke router and first IP address information for first spoke router 110A (404). In some examples, the first reachability information specifies a first tag with which at least a first interface of first spoke router 110A is configured. The first tag corresponds to a neighborhood to which the first interface of first spoke router 110A is assigned. The first IP address information comprises a first IP address and a first port of first spoke router 110A. First spoke router 110A forwards the modified first packet to hub router 110B (406).

Hub router 110B forwards the modified first packet to second spoke router 110C (408). Second spoke router 110C receives, from hub router 110B, the modified first packet (410). Second spoke router 110C stores the metadata of the first packet, and forwards the first packet to client device 100B without the metadata.

Because second spoke router 110C is connected to service provider network 150 via a unidirectional connection, first spoke router 110A may be unable to initiate a peering connection with second spoke router 110C. Therefore, in this example, second spoke router 110C does not forward a second packet to first spoke router 110A that includes the second reachability information and second IP address information for second spoke router 110C. Instead, in this example, second spoke router 110C may initiate the peering connection with first spoke router 110A using the metadata of the first packet.

For example, second spoke router 110C determines that the first reachability information is compatible with second reachability information for second spoke router 110C (412). In some examples, the second reachability information specifies a second tag with which at least a second interface of second spoke router 110C is configured. The second tag corresponds to a neighborhood to which the second interface of second spoke router 110C is assigned. For example, first spoke router 110A determines, based on the first reachability information and the second reachability information, that both the first interface of first spoke router 110A and the second interface of second spoke router 110C are configured with a same tag such that both the first interface of first spoke router 110A and the second interface of second spoke router 110C are assigned a same neighborhood.

Based on the determination that the first reachability information is compatible with the second reachability information, second spoke router 110C uses the first IP address information and second IP address information for second spoke router 110C to initiate a peering connection with first spoke router 110A along a first path which bypasses hub router 110B, e.g., along link 16E (414). The second IP address information comprises a second IP address and a second port of second spoke router 110C.

In some examples, second spoke router 110C determines one or more first path quality metrics for the first path which bypasses hub router 110B and one or more second path quality metrics for a second path from second spoke router 110C, through hub router 110B, to first spoke router 110A. For example, the first and second path quality metrics are one or more of a latency, jitter, packet loss, or bandwidth of the first and second path, respectively. In some examples, first spoke router 110A, hub router 110B, and second spoke router 110C may inject path quality metrics into the network traffic for the session between client devices 100A, 110B prior to forwarding the network traffic so as to reduce the network requirements of the path quality metrics. Second spoke router 110C compares the first and second path quality metrics to determine if the path bypassing hub router 110B meets or exceeds performance requirements in comparison to the path through hub router 110B.

In response to determining that the one or more first path quality metrics meet or exceed the second path quality metrics and/or one or more SLA requirements for the session, second spoke router 110C forwards, to first spoke router 110A, and along the path which bypasses hub router 110B, subsequent packets of the reverse packet flow (416). For example, second spoke router 110C may forward the subsequent packets of the reverse packet flow along the path which bypasses hub router 110B in response to determining that the path which bypasses hub router 110B provides the same or better performance than the path through hub router 110B. In addition or alternatively, second spoke router 110C may forward the subsequent packets of the reverse packet flow along the path which bypasses hub router 110B in response to determining that the path which bypasses hub router 110B meets or exceeds SLA requirements for the session between client devices 100A and 100B. In response to receiving from second spoke router 110C, the subsequent packets of the reverse packet flow along the path which bypasses hub router 110B, first spoke router 110A forwards, to second spoke router 110C, and along the path which bypasses hub router 110B, subsequent packets of the forward packet flow (418).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a first spoke router of a plurality of spoke routers, a first packet of a plurality of packets of a forward packet flow originating from a first client device and destined for a second client device;
modifying, by the first spoke router, the first packet of the forward packet flow to include metadata specifying first reachability information for the first spoke router and first Internet Protocol (IP) address information for the first spoke router; and
forwarding, by the first spoke router, the first packet to a hub router for forwarding to a second spoke router of the plurality of spoke routers for forwarding, by the second spoke router, to the second client device,
wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and
wherein the first client device belongs to a first customer network of the plurality of customer networks and the second client device belongs to a second customer network of the plurality of customer networks.

2. The method of claim 1, further comprising:
receiving, by the first spoke router and from the hub router, a second packet of a plurality of packets of a reverse packet flow originating from the second client device and destined for the first client device, wherein the second packet includes metadata specifying second reachability information for the second spoke router and second IP address information for the second spoke router;
determining, by the first spoke router, that the first reachability information is compatible with the second reachability information;
initiating, by the first spoke router, based on the determination that the first reachability information is compatible with the second reachability information, and using the first IP address information and the second IP address information, a peering connection with the second spoke router along a path which bypasses the hub router; and
forwarding, by the first spoke router, to the second spoke router, and along the path which bypasses the hub router, subsequent packets of the forward packet flow.

3. The method of claim 2,
wherein the path which bypasses the hub router comprises a first path which bypasses the hub router,
wherein the method further comprises:
determining one or more first path quality metrics for the first path which bypasses the hub router;
determining one or more second path quality metrics for a second path from the first spoke router through the hub router to the second spoke router; and
comparing, the one or more first path quality metrics to the one or more second path quality metrics, and
wherein forwarding the subsequent packets of the forward packet flow comprises forwarding, along the first path which bypasses the hub router, the subsequent packets of the forward packet flow based on the comparison of the one or more first path quality metrics to the one or more second path quality metrics.

4. The method of claim 3,
wherein determining the one or more first path quality metrics for the first path comprises determining, via a first Bidirectional Forwarding Detection (BFD) session between the first spoke router and the second spoke router, the one or more first path quality metrics, and
wherein determining the one or more second path quality metrics for the second path comprises determining, via a second BFD session between the first spoke router and the hub router, the one or more second path quality metrics.

5. The method of claim 2, wherein the metadata of the second packet further specifies that a path over which the second spoke router forwards the plurality of packets of the reverse packet flow comprises a bidirectional path.

6. The method of claim 2,
wherein the first reachability information comprises a first tag with which at least a first interface of the first spoke router is configured, and
wherein the second reachability information comprises a second tag with which at least a second interface of the second spoke router is configured, and
wherein determining that the first reachability information is compatible with the second reachability information comprises determining that the first tag and the second tag specify a same label.

7. The method of claim 2,
wherein the first IP address information comprises a first IP address and a first port of the first spoke router, and
wherein the second IP address information comprises a second IP address and a second port of the second spoke router.

8. The method of claim 1, further comprising:
in response to the second spoke router initiating, based on the first reachability information and using the first IP address information, a peering connection with the first spoke router along a path which bypasses the hub router, forwarding, by the first spoke router, to the second spoke router, and along the path which bypasses the hub router, subsequent packets of the forward packet flow.

9. The method of claim 8, further comprising:
receiving, by the first spoke router and from the hub router, a second packet of a plurality of packets of a reverse packet flow originating from the second client device and destined for the first client device; and
after forwarding the first packet specifying the first reachability information and the first IP address information, receiving, by the first spoke router, from the second router, and via the path which bypasses the hub router, a third packet of the plurality of packets of the reverse packet flow.

10. The method of claim 9, wherein a path over which the first spoke router receives the plurality of packets of the reverse packet flow from the second spoke router comprises a unidirectional path.

11. The method of claim 1, wherein modifying the first packet to include the metadata specifying the first reachability information for the first spoke router and the first IP address information for the first spoke router comprises:
modifying the first packet to include metadata specifying a first tag with which at least a first interface of the first spoke router is configured and the first IP address information for the first spoke router.

12. A first spoke router of a plurality of spoke routers, the first spoke router comprising processing circuitry configured to:
receive a first packet of a plurality of packets of a forward packet flow originating from a first client device and destined for a second client device;
modify the first packet of the forward packet flow to include metadata specifying first reachability information for the first spoke router and first Internet Protocol (IP) address information for the first spoke router; and
forward the first packet to a hub router for forwarding to a second spoke router of the plurality of spoke routers for forwarding, by the second spoke router, to the second client device,
wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and
wherein the first client device belongs to a first customer network of the plurality of customer networks and the second client device belongs to a second customer network of the plurality of customer networks.

13. The first spoke router of claim 12, wherein the processing circuitry is further configured to:
receive, from the hub router, a second packet of a plurality of packets of a reverse packet flow originating from the second client device and destined for the first client device, wherein the second packet includes metadata specifying second reachability information for the second spoke router and second IP address information for the second spoke router;
determine that the first reachability information is compatible with the second reachability information;
initiate, based on the determination that the first reachability information is compatible with the second reachability information, and using the first IP address information and the second IP address information, a peering connection with the second spoke router along a path which bypasses the hub router; and
forward, to the second spoke router, and along the path which bypasses the hub router, subsequent packets of the forward packet flow.

14. The first spoke router of claim 13,
wherein the path which bypasses the hub router comprises a first path which bypasses the hub router,
wherein the processing circuitry is further configured to:
determine one or more first path quality metrics for the first path which bypasses the hub router;
determine one or more second path quality metrics for a second path from the first spoke router through the hub router to the second spoke router; and
compare, the one or more first path quality metrics to the one or more second path quality metrics, and
wherein to forward the subsequent packets of the forward packet flow, the processing circuitry is configured to forward, along the first path which bypasses the hub router, the subsequent packets of the forward packet flow based on the comparison of the one or more first path quality metrics to the one or more second path quality metrics.

15. The first spoke router of claim 14,
wherein to determine the one or more first path quality metrics for the first path, the processing circuitry is configured to determine, via a first Bidirectional Forwarding Detection (BFD) session between the first spoke router and the second spoke router, the one or more first path quality metrics, and
wherein to determine the one or more second path quality metrics for the second path, the processing circuitry is configured to determine, via a second BFD session between the first spoke router and the hub router, the one or more second path quality metrics.

16. The first spoke router of claim 13, wherein the metadata of the second packet further specifies that a path over which the second spoke router forwards the plurality of packets of the reverse packet flow comprises a bidirectional path.

17. The first spoke router of claim 13,
wherein the first reachability information comprises a first tag with which at least a first interface of the first spoke router is configured, and
wherein the second reachability information comprises a second tag with which at least a second interface of the second spoke router is configured, and
wherein to determine that the first reachability information is compatible with the second reachability information, the processing circuitry is configured to determine that the first tag and the second tag specify a same label.

18. The first spoke router of claim 13,
wherein the first IP address information comprises a first IP address and a first port of the first spoke router, and
wherein the second IP address information comprises a second IP address and a second port of the second spoke router.

19. The first spoke router of claim 12, wherein, in response to the second spoke router initiating, based on the first reachability information and using the first IP address information, a peering connection with the first spoke router along a path which bypasses the hub router, the processing circuitry is configured to forward to the second spoke router, and along the path which bypasses the hub router, subsequent packets of the forward packet flow.

20. The first spoke router of claim 19, wherein the processing circuitry is configured to:
- receive, from the hub router, a second packet of a plurality of packets of a reverse packet flow originating from the second client device and destined for the first client device; and
- after forwarding the first packet specifying the first reachability information and the first IP address information, receive, from the second router, and via the path which bypasses the hub router, a third packet of the plurality of packets of the reverse packet flow.

21. A non-transitory, computer-readable medium comprising instructions that, when executed, are configured to cause processing circuitry of a first spoke router of a plurality of spoke routers to:
- receive a first packet of a plurality of packets of a forward packet flow originating from a first client device and destined for a second client device;
- modify the first packet of the forward packet flow to include metadata specifying first reachability information for the first spoke router and first Internet Protocol (IP) address information for the first spoke router; and
- forward the first packet to a hub router for forwarding to a second spoke router of the plurality of spoke routers for forwarding, by the second spoke router, to the second client device,
  - wherein the plurality of spoke routers and the hub router are configured to operate according to a hub-and-spoke topology to form a Software-Defined Wide Area Network (SD-WAN) that provides interconnectivity to a plurality of customer networks connected to the plurality of spoke routers, and
  - wherein the first client device belongs to a first customer network of the plurality of customer networks and the second client device belongs to a second customer network of the plurality of customer networks.

* * * * *